United States Patent
Tanaka et al.

(10) Patent No.: US 8,700,856 B2
(45) Date of Patent: Apr. 15, 2014

(54) METHOD FOR ACCESSING MIRRORED SHARED MEMORIES AND STORAGE SUBSYSTEM USING METHOD FOR ACCESSING MIRRORED SHARED MEMORIES

(75) Inventors: Katsuya Tanaka, Yokohama (JP); Masanori Takada, Yokohama (JP); Shintaro Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 13/501,022

(22) PCT Filed: Mar. 23, 2012

(86) PCT No.: PCT/JP2012/002007
§ 371 (c)(1),
(2), (4) Date: Apr. 9, 2012

(87) PCT Pub. No.: WO2013/140459
PCT Pub. Date: Sep. 26, 2013

(65) Prior Publication Data
US 2013/0254487 A1    Sep. 26, 2013

(51) Int. Cl.
*G06F 12/00* (2006.01)
*G06F 12/08* (2006.01)
*G06F 3/06* (2006.01)

(52) U.S. Cl.
CPC .......... *G06F 12/0808* (2013.01); *G06F 3/0646* (2013.01)
USPC ............ 711/123; 711/147; 711/161; 711/162

(58) Field of Classification Search
CPC ..................... G06F 12/0808; G06F 3/0646
USPC ................... 711/123, 147, 161, 162
See application file for complete search history.

(56) References Cited

U.S. PATENT DOCUMENTS 6,341,332 B2   1/2002   Fujimoto et al.
7,340,555 B2   3/2008   Ashmore et al.
(Continued)

FOREIGN PATENT DOCUMENTS

JP   2000-10901    1/2000
JP   2000-181891   6/2000

OTHER PUBLICATIONS

International Search Report and Written Opinion on application PCT/JP2012/002007 mailed Dec. 20, 2012; 13 pages.

(Continued)

*Primary Examiner* — Reba I Elmore
(74) *Attorney, Agent, or Firm* — Foley & Lardner LLP

(57) ABSTRACT

According to a prior art storage subsystem, shared memories are mirrored in main memories of two processors providing redundancy. When the consistency of writing order of data is not ensured among mirrored shared memories, the processors must read only one of the mirrored shared memories to have the write order of the read data correspond among the two processors. As a result, upon reading data from the shared memories, it is necessary for a processor to read data from the main memory of the other processor, so that the overhead is increased compared to the case where the respective processors read their respective main memories. According to the storage subsystem of the present invention, a packet redirector having applied a non-transparent bridge enables to adopt a PCI Express multicast to the writing of data from the processor to the main memory, so that the order of writing data into the shared memories can be made consistent among the mirrored memories. As a result, data can be read from the shared memories speedily by accessing respective main memories in the respective processors.

16 Claims, 31 Drawing Sheets

(56) References Cited

U.S. PATENT DOCUMENTS

| | | | |
|---|---|---|---|
| 8,429,325 B1* | 4/2013 | Onufryk et al. | 710/316 |
| 2003/0033478 A1 | 2/2003 | Fujimoto et al. | |
| 2008/0120459 A1* | 5/2008 | Kaneda et al. | 711/112 |
| 2011/0167189 A1 | 7/2011 | Matsubara et al. | |
| 2011/0238909 A1* | 9/2011 | Kumar et al. | 711/114 |
| 2013/0254435 A1* | 9/2013 | Shapiro et al. | 710/23 |

OTHER PUBLICATIONS

"PCI Express Base Specification, Revision 3.0, Section 6.14", Nov, 10, 2010, PCI-SIG, pp. 546-553.

"Using Non-transparent Bridging in PCI Express Systems", 2004, Jack Regula, pp. 4-30 URL: http://www.plxtech.com/pdf/technical/expresslane/nantransparentbridging.pfd.

* cited by examiner

| Shared memory address | Transmission destination MC | Unfinished write flag | |
|---|---|---|---|
| abcd | 0 | 0 | 1903 |
| efgh | 1 | 1 | 1904 |
| | | | |
| | | | |
| | | | |

METHOD FOR ACCESSING MIRRORED SHARED MEMORIES AND STORAGE SUBSYSTEM USING METHOD FOR ACCESSING MIRRORED SHARED MEMORIES

TECHNICAL FIELD

The present invention relates to a storage subsystem, and more specifically, to a method for accessing mirrored shared memories storing control information within the storage controllers.

BACKGROUND ART

A storage subsystem generally comprises a storage controller and nonvolatile storage media capable of allowing random access. The storage media can be, for example, a disk array composed of a large number of hard disk drives (HDDs) and/or solid state drives (SSDs). The storage controller comprises a frontend interface (abbreviated as FEIF) for coupling a host system, a backend interface (abbreviated as BEIF) for coupling a disk array, and a cache memory (abbreviated as CM) for temporarily storing the data written to and read from the disk array by the host system. In addition, the storage controller has a processor for controlling data transfer between the host system and the cache memory and between the disk array and the cache memory.

A storage subsystem including a plurality of processors comprises a shared memory (abbreviated as SM) for storing the control information of the storage subsystem that can be accessed from the plurality of processors within the storage controller. The control information of the storage subsystem includes, for example, an address translation table for translating a data storage destination address information referred to by the host system and a data storage destination address information in a disk array used within the storage subsystem.

In a storage controller adopting general-purpose technology, the cache memory and the shared memory are arranged within the main memory coupled to a general-purpose processor (hereinafter referred to as processor). A "PCI Express" (Registered Trademark) is known as a standard specification of the communication network for coupling the processor with FEIF, BEIF and the like.

In a storage subsystem requiring high reliability, the components within the storage controller including the shared memory provide redundancy. The storage controller is composed of two or more clusters and the shared memories are mirrored among the clusters. The mirrored shared memories are used not only to ensure high reliability but also to enhance the performance of the storage subsystem, such as load balancing among a plurality of clusters, operating a plurality of ports through cooperation of clusters and backup processing.

Patent literature 1 discloses an art related to a storage subsystem comprising mirrored shared memories. Patent literature 2 discloses an art related to access order enforcement regarding shared memories. Patent literature 3 discloses an art related to a storage subsystem composed of a plurality of clusters. Further, non patent literature 1 discloses a multicast standardized via PCI Express. Non patent literature 2 discloses an art related to inter-cluster coupling having applied PCI Express systems.

CITATION LIST

Patent Literature

PTL 1: Japanese Patent Application Laid-Open Publication No. 2000-010901 (Corresponding U.S. Pat. No. 6,341, 332)

PTL 2: Japanese Patent Application Laid-Open Publication No. 2000-181891

PTL 3: US Patent Application Publication No. US2011/ 0167189

Non Patent Literature

NPL 1: "PCI Express Base Specification, Revision 3.0, Section 6.14.", Nov. 10, 2010, PCI-SIG, p. 546-553

NPL 2: "Using Non-transparent Bridging in PCI Express Systems", 2004, Jack Regula, p. 4-30, URL http://www-.plxtech.com/pdf/technical/expresslane/Nontransparent-Bridging.pdf

SUMMARY OF INVENTION

Technical Problem

The requirement of realizing a shared memory is, as taught in patent literature 2, that the access to a shared memory from a certain processor can be similarly visible from other processors. Especially in mirrored shared memories of a storage subsystem, it is required that the order of writing data into two memories disposed at different physical locations correspond.

In the storage subsystem applying the prior art technology, the shared memories are mirrored to main memories of two processors. If consistency of the writing order is not ensured among mirrored shared memories, the two processors must read only one of the mirrored shared memories to ensure the consistent write order of the read data among processors. As a result, when reading data from the shared memories, one processor must read the main memory of the other processor.

Further, upon reading data from the main memory of the other processor in the storage controller, from the viewpoint of failure handling, it is necessary to transmit a plurality of write requests for the reading operation as shown in patent literature 3 instead of transmitting a read request, so that the overhead becomes high compared to the case where the respective processors read data from their main memories.

Further, the multicast standardized via a PCI Express system is a function for writing data in the same order to a plurality of different locations among components coupled via PCI Express. However, the data from the processor cannot be written into the main memory of the processor using the multicast function. Therefore, it is difficult to apply multicast to the writing of data from the processors to the mirrored shared memories in a storage system having shared memories disposed in the main memories of the processors.

The present invention aims at solving the problems of the prior art by providing a storage subsystem having processors and mirrored shared memories within storage controllers, wherein the components within the storage controllers are coupled via PCI Express, and when a data is written from the processors to the shared memories, the consistency of writing order of the data is ensured among the mirrored shared memories.

Solution to Problem

We will now describe the outline of a typical configuration of the present invention disclosed in the specification. One typical embodiment of the present invention realizing the above-described object is a storage subsystem comprising a storage controller, wherein the storage controller comprises two processors, two memories coupled to the respective processors, two switches coupled to the respective processors and at least one of the switches having a multicast function, a non-transparent bridge built into the respective switches and coupling the two switches via a link, and mirrored shared memories disposed in the two memories, wherein the storage subsystem has the following characteristic features.

The storage controller has a packet redirector coupled to at least one of the two switches. In the switch having a multicast function, the processor coupled to the switch and the non-transparent bridge are set within the same multicast group. The packet redirector transfers the received packet in the received order to the multicast group address. The processor coupled to the switch having the multicast function sends the packet to the packet redirector to thereby execute writing of data to the mirrored shared memories. The other one of the two processors sends the packet either to a packet redirector via an inter-switch link coupled via the non-transparent bridge or to a multicast function (multicast group address of a multicast function) via an inter-switch link coupled via another non-transparent bridge to thereby execute writing of data to the mirrored shared memories.

More specifically, the present invention provides a storage subsystem having a storage controller, the storage controller comprising a first processor, a first memory coupled to the first processor, a first switch coupled to the first processor and having a first multicast function and a first non-transparent bridge, a second processor, a second memory coupled to the second processor, and a second switch coupled to the second processor and having a second non-transparent bridge, wherein the first non-transparent bridge and the second non-transparent bridge are coupled via a first link, cache memories storing user data and mirrored shared memories storing control information are formed within the first memory and the second memory, the storage controller is equipped with a first packet redirector coupled to the first switch, the first switch has the first processor and the first non-transparent bridge set within a same multicast group, the first packet redirector transfers the received packet in the received order to the multicast group address, and the first processor transmits a packet to the first packet redirector to thereby execute writing of data to the mirrored shared memories.

According to another aspect of the invention, the storage subsystem characterizes in that the second switch has a second multicast function, a second packet redirector is coupled to the second switch, the second switch has the second processor and the second non-transparent bridge set within a same multicast group, the second packet redirector transfers the received packet in the received order to the multicast group address, the first processor transmits a packet to the first packet redirector or the second packet redirector to thereby execute writing of data to the mirrored shared memories, and the second processor transmits a packet to the first packet redirector or the second packet redirector to thereby execute writing of data to the mirrored shared memories.

According further to the present storage subsystem, the first switch has a third non-transparent bridge, the second switch has a fourth non-transparent bridge, the third non-transparent bridge and the fourth non-transparent bridge are coupled via a second link, the second link is used for writing data from the first processor or the second processor to the cache memories, and the first link is used for writing data from the first processor or the second processor to the mirrored shared memories. In addition, the first packet redirector is a fifth non-transparent bridge built into the second switch.

Furthermore, the second packet redirector is a sixth non-transparent bridge built into the first switch, and a link coupling the first switch and the fifth non-transparent bridge and a link coupling the second switch and the sixth non-transparent bridge is a same third link.

Even further according to the present storage subsystem, the third link has a first virtual channel and a second virtual channel, wherein the first virtual channel is used when the first processor transmits a packet from the first switch to the fifth non-transparent bridge and the second virtual channel is used when the second processor transmits a packet from the second switch to the sixth non-transparent bridge.

According to another aspect of the present invention, the first packet redirector is a third switch having a seventh non-transparent bridge, and two ports of the third switch including a port associated with the seventh non-transparent bridge are coupled to the first switch. Further, the second packet redirector is a fourth switch having an eighth non-transparent bridge, and two ports of the fourth switch including a port associated with the eighth non-transparent bridge are coupled to the second switch. In addition thereto, the first switch has a third non-transparent bridge, the second switch has a fourth non-transparent bridge, the third non-transparent bridge and the fourth non-transparent bridge are coupled via a second link, the second link is used to write data from the first processor or the second processor to the cache memories, and the first link is used to write data from the first processor or the second processor to the mirrored shared memories.

According to another aspect of the present storage subsystem, when reading control information from the mirrored shared memories, the first processor reads the information from the first memory and the second processor reads the information from the second memory. Furthermore, a first table for managing a write execution status from the first processor to the mirrored shared memories is stored in the first memory, and a second table for managing a write execution status from the second processor to the mirrored shared memories is stored in the second memory.

The present invention further provides a method for accessing the mirrored shared memories in the storage subsystem, wherein the method for writing the control information from the first processor to the mirrored shared memories comprises a step of setting an unfinished write flag associated with the control information in the first table by the first processor, a step of transmitting a packet storing the control information from the first processor, and a step of transmitting a packet storing data for clearing the unfinished write flag via a same data transfer path as the path through which the packet storing the control information is transmitted from the first processor, and wherein a method for writing control information from the second processor to the mirrored shared memories comprises a step of setting an unfinished write flag associated with the control information in the second table by the second processor, a step of transmitting a packet storing the control information from the second processor, and a packet storing the data for clearing the unfinished write flag is transmitted via a same data transfer path as the path through which the packet storing the control information is transmitted from the second processor.

Even further according to the method for accessing mirrored shared memories in the storage subsystem having a first table for managing a write execution status from the first processor to the mirrored shared memories stored in the first memory and a second table for managing a write execution status from the second processor to the mirrored shared memories stored in the second memory, the method for writing control information from the first processor to the mirrored shared memories comprises a step of determining whether a packet storing the control information should be sent to the first packet redirector or to the multicast group address of the second multicast function, a step of setting an unfinished write flag associated with the control information in the first table by the first processor, a step of transmitting a packet storing the control information from the first processor, and a step of transmitting a packet storing data for clearing the unfinished write flag via a same data transfer path as the path through which the packet storing the control information is transmitted from the first processor, wherein the method for writing control information from the second processor to the mirrored shared memories comprises a step of determining whether the packet storing the control information should be transmitted to the second packet redirector or to the multicast group address of the first multicast function, a step of setting an unfinished write flag associated with the control information in the second table by the second processor, a step of transmitting a packet storing the control information from the second processor, and a step of transmitting a packet storing the data for clearing the unfinished write flag via a same data transfer path as the path through which the packet storing the control information is transmitted by the second processor.

In addition, according to the present method, a method for reading the control information from the mirrored shared memories to the first processor comprises a step of reading an unfinished write flag associated with the control information from the first table by the first processor, and a step of reading the control information from the first memory by the first processor when the unfinished write flag shows a write finished status, wherein a method for reading the control information from the mirrored shared memories to the second processor comprises a step of reading an unfinished write flag associated to the control information from the second table by the second processor, and a step of reading the control information from the second memory by the second processor if the unfinished write flag indicates a write finished status. The present method further comprises a step of delaying the reading of the control information from the first memory by the first processor or a step of delaying the reading of the control information from the second memory by the second processor until the unfinished write flag indicates a write finished status when the unfinished write flag indicates a write unfinished status.

Advantageous Effects of Invention

According to the present invention, a packet redirector enables a PCI Express multicast to be applied to the writing of data from the processor to the main memories. Further, since the order of data written into the mirrored shared memories from the two processors within the storage controller are consistent, the respective processors can access their main memories to read the control information within the shared memories at high speed, according to which the performance of the storage subsystem can be enhanced.

DESCRIPTION OF EMBODIMENTS

Figure 1:
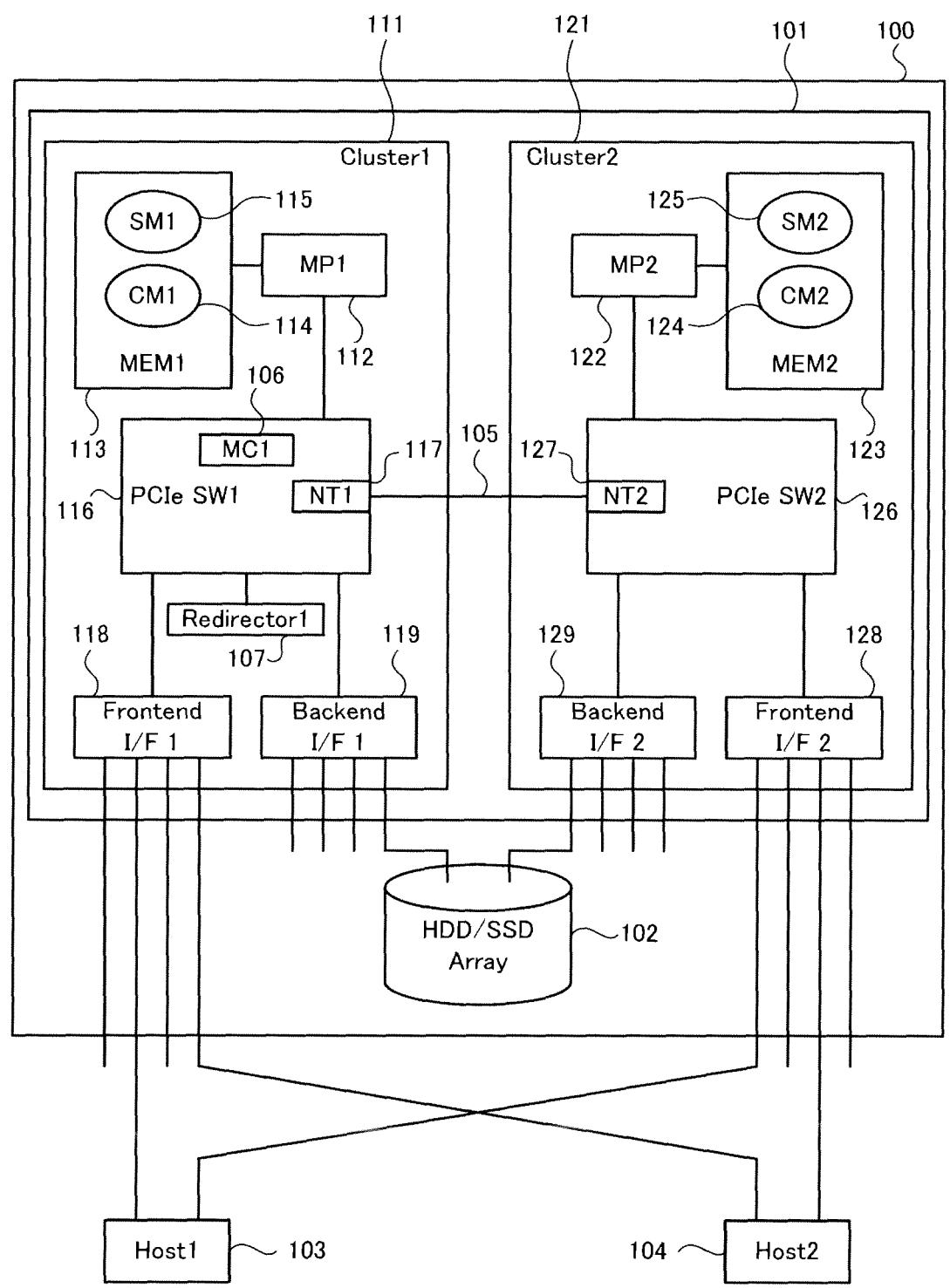
FIG. 1 is a view showing a configuration example of a storage subsystem according to embodiment 1.

Now, the preferred embodiments of the present invention will be described with reference to the drawings. In all the embodiments, the components and elements denoted with the same reference numbers refer to substantially the same components and elements. In the description, various information are referred to as "management table", but the various information can be expressed via data structures other than tables. Further, the "management table" can also be referred to as "management information" to show that the information does not depend on the data structure.

The processes are sometimes described using the term "program" as the subject. The program is executed by a processor such as a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or storage media, for example.

Each element, such as an LU (Logical Unit), can be identified via numbers, but other types of identification information such as names can be used as long as they are identifiable information. The equivalent elements are provided with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

Embodiment 1

FIGS. 1 through 17 are used to describe a storage subsystem according to a first embodiment of the present invention and the operation thereof. According to embodiment 1, in summary, the order of writing data into two shared memories from processors is matched via a multicast function of a PCI Express switch and a packet redirector coupled to the PCI Express switch.

FIG. 1 illustrates an example of configuration of the storage subsystem according to embodiment 1 of the present invention. The storage subsystem 100 is composed of a storage controller 101 and a disk array 102. The disk array 102 is composed, for example, of a group of storage devices such as hard disk drives (HDDs) or solid state drives (SSDs). The storage controller 101 has external host systems 103 (Host1) and 104 (Host2) coupled thereto.

The storage controller 101 is composed of two clusters, a cluster 111 (Cluster1) and a cluster 121 (Cluster2). The cluster 111 (Cluster1) is composed of a processor 112 (MP1), a frontend interface 118 (FEIF1), a backend interface 119 (BEIF1), and a PCI Express switch 116 (PCIe (Registered Trademark) SW1) coupling the same (hereinafter, the PCI Express switch is simply referred to as switch).

A main memory 113 (MEM1) coupled to the processor 112 (MP1) comprises a cache memory 114 (CM1) and a shared memory 115 (SM1). The main memory 113 (MEM1) stores programs executed via the processor 112 (MP1) and management tables being referred to.

The processor 112 (MP1) controls the transfer of data between the frontend interface 118 (FEIF1) and the cache memory 114 (CM1) and between the cache memory 114 (CM1) and the backend interface 119 (BEIF1). Further, the processor 112 (MP1) includes a Root Complex (not shown) for coupling with the switch 116.

The frontend interface 118 (FEIF1) converts the data transfer protocol among the host systems 103 (Host1) and 104 (Host2) and the storage controller 101 and the data transfer protocol within the storage controller 101.

The backend interface 119 (BEIF1) converts the data transfer protocol within the storage controller 101 and the data transfer protocol between the storage controller 101 and the disk array 102.

The switch 116 has a multicast function 106 (MC1) standardized via PCI Express specification. According to storage subsystem 100 of embodiment 1, a processor 112 (MP1) coupled to an upstream port of the switch 116 (in further detail, a Root Complex (not shown) included in the processor) and a non-transparent bridge are set within the same multicast group. The switch 116 comprises a non-transparent bridge 117 (NT1) for realizing inter-cluster coupling.

A packet redirector 107 (Redirector1) is coupled to the switch 116. The packet redirector 107 (Redirector1) has a function to transfer the packet received via the switch to the multicast address of the switch in the order in which the packets were received.

The cluster 121 (Cluster2) has a similar configuration as cluster 111 (Cluster1) except for the point that it does not have a packet redirector 107 (Redirector1) and that the switch 126 does not have a multicast function. In other words, the cluster 121 (Cluster2) is composed of a processor 122 (MP2), a frontend interface 128 (FEIF2), a backend interface 129 (BEIF2), and a switch 126 (SW2) coupling the same.

A main memory 123 (MEM2) coupled to the processor 122 (MP2) comprises a cache memory 124 (CM2) and a shared memory 125 (SM2). The main memory 123 (MEM2) stores programs executed via the processor 122 (MP2) and management tables being referred to.

The processor 122 (MP2) controls the transfer of data between the frontend interface 128 (FEIF2) and the cache memory 124 (CM2) and between the cache memory 124 (CM2) and the backend interface 129 (BEIF2). Further, the processor 122 (MP2) includes a Root Complex (not shown) for coupling with the switch 126.

The frontend interface 128 (BEIF2) converts the data transfer protocol among the host systems 103 (Host1) and 104 (Host2) and the data transfer protocol within the storage controller 101.

The backend interface 129 (BEIF2) converts the data transfer protocol within the storage controller 101 and the data transfer protocol between the storage controller 101 and the disk array 102.

The switch 126 has a non-transparent bridge 127 (NT2) for realizing inter-cluster coupling. The cluster 111 (Cluster1) and the cluster 121 (Cluster2) are coupled via an NT (Non Transparent) link 105 coupling the non-transparent bridge 117 (NT1) and the non-transparent bridge 127 (NT2).

The processor 112 (MP1) and the processor 122 (MP2) mutually communicate via an NT link 105, and may mirror and temporarily store the user data received from the host systems 103 (Host1) and 104 (Host2) in cache memories 114 (CM1) and 124 (CM2). Moreover, the processor 112 (MP1) and the processor 122 (MP2) mutually communicate via an NT link 105, and minor and store the control information within the storage subsystem 100 in shared memories 115 (SM1) and 125 (SM2).

If the processor 112 (MP1) includes a plurality of PCI Express ports, the processor 112 (MP1) and the frontend interface 118 (FEIF1) or the backend interface 119 (BEIF1) can be coupled without having a switch disposed therebetween. Similarly, if the processor 122 (MP2) includes a plurality of PCI Express ports, the processor 122 (MP2) and the frontend interface 128 (FEIF2) or the backend interface 129 (BEIF2) can be coupled without having a switch disposed therebetween.

Figure 2:
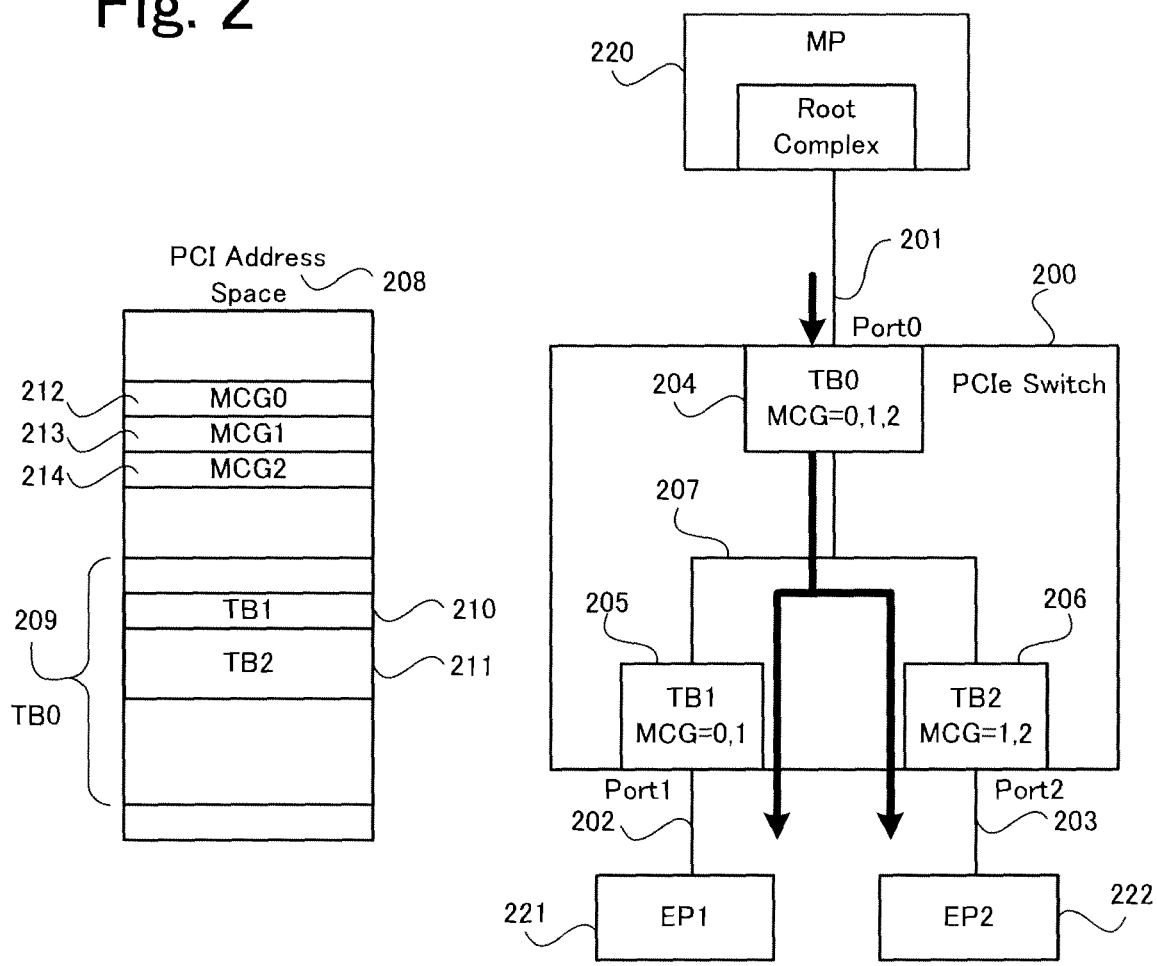
FIG. 2 is a view showing a multicast operation in a PCI Express switch.

Next, a multicast standardized via PCI Express will be described with reference to FIG. 2. FIG. 2 is a view illustrating the operation of a PCI Express switch 200 supporting multicast. The switch 200 comprises an upstream port 201 and two downstream ports 202 and 203. The upstream port 201 is coupled to a transparent bridge 204 (TB0), the downstream port 202 is coupled to a transparent bridge 205 (TB1), and the downstream port 203 is coupled to a transparent bridge 206 (TB2), respectively within the switch 200. The transparent bridges 204 (TB0), 205 (TB1) and 206 (TB2) are mutually coupled via a virtual PCI bus 207.

At first, a normal switch operation which is not a multicast will be illustrated. In a PCI address space 208, the pass address range 209 of the transparent bridge 204 (TB0) includes a pass address range 210 of the transparent bridge 205 (TB1) and a pass address range 211 of the transparent bridge 206 (TB2). If a transmission destination address of a packet entered through the upstream port 201 into the switch 200 is included in pass address range 210, the packet is transferred to the downstream port 202, and if the address is included in pass address range 211, the packet is transferred to the downstream port 203.

Next, a multicast operation will be described. In the multicast operation of the PCI Express switch, packets are copied and one or more Endpoints through which the packets are to be transferred are assembled to constitute a multicast group. In further detail, the Root Complex included in the processor can be included in the multicast group. In other words, one or more Endpoints coupled to a downstream port of the switch or a processor coupled to an upstream port can be set as the transmission destination of the multicast packet.

For example, as shown in FIG. 2, a processor 220 (MP) coupled to a transparent bridge 204 (TB0) and an Endpoint 221 (EP1) coupled to a transparent bridge 205 (TB1) are set as multicast group 0 (MCG0). The processor 220 (MP) coupled to the transparent bridge 204 (TB0), the Endpoint 221 (EP1) coupled to the transparent bridge 205 (TB1) and an Endpoint 222 (EP2) coupled to a transparent bridge 206 (TB2) are set as multicast group 1 (MCG1). Further, the processor 220 (MP) coupled to the transparent bridge 204 (TB0) and the Endpoint 222 (EP2) coupled to the transparent bridge 206 (TB2) are set as multicast group 2 (MCG2). A multicast group in which the multicast packet passing a transparent bridge belongs is set to an MC_Receive resistor of each transparent bridge. That is, the multicast group 0 (MCG0), the multicast group 1 (MCG1) and the multicast group 2 (MCG2) are set to the MC_Receive resistor of the transparent bridge 204 (TB0) as multicast groups passing through the transparent bridge 204 (TB0). The multicast group 0 (MCG0) and the multicast group 1 (MCG1) are set to the MC_Receive resistor of the transparent bridge 205 (TB1) as multicast groups passing through the transparent bridge 205 (TB1). The multicast group 1 (MCG1) and the multicast group 2 (MCG2) are set to the MC_Receive resistor of the transparent bridge 206 (TB2) as multicast groups passing through the transparent bridge 206 (TB2).

If the transmission destination address of the packet entered through the upstream port 201 into the switch 200 is included in the multicast address 212 (MCG0), the packet is transferred via the transparent bridge 205 (TB1) in which the multicast group 0 (MCG0) is set in the MC_Receive resistor to the downstream port 202. If the transmission destination address of the packet entered through the upstream port 201 into the switch 200 is included in the multicast address 213 (MCG1), the packet is transferred via the transparent bridges 205 (TB1) and 206 (TB2) in which the multicast group 1 (MCG1) is set in the MC_Receive resistor to the downstream ports 202 and 203.

If the transmission destination address of the packet entered through the upstream port 201 into the switch 200 is included in the multicast address 214 (MCG2), the packet is transferred via the transparent bridge 206 (TB2) in which the multicast group 2 (MCG2) is set in the MC_Receive resistor to the downstream port 203.

In the multicast operation of the PCI Express switch, there is a limitation that the packet is not transferred via the multicast operation to the direction of the port through which the packet has entered. By this limitation, for example as shown in FIG. 2, even if the transmission destination address of the packet entered through the upstream port 201 is included in the multicast address 213 (MCG1), the packet will not be transferred to the direction of the upstream port 201 coupled to the transparent bridge 204 (TB0) in which the multicast group 1 is set in the MC_Receive resistor.

In other words, even if the processor 112 (MP1) sends a packet to the multicast address of the multicast function 106 (MC1) of the switch 116 (SW1) in the storage subsystem 100, it cannot send the packet to the main memory 113 (MEM1). That is, even if the packet is sent "directly" from processor 112 (MP1) to the multicast address of the switch, it is not possible to write data into two shared memories 115 (SM1) and 125 (SM2).

Figure 3:
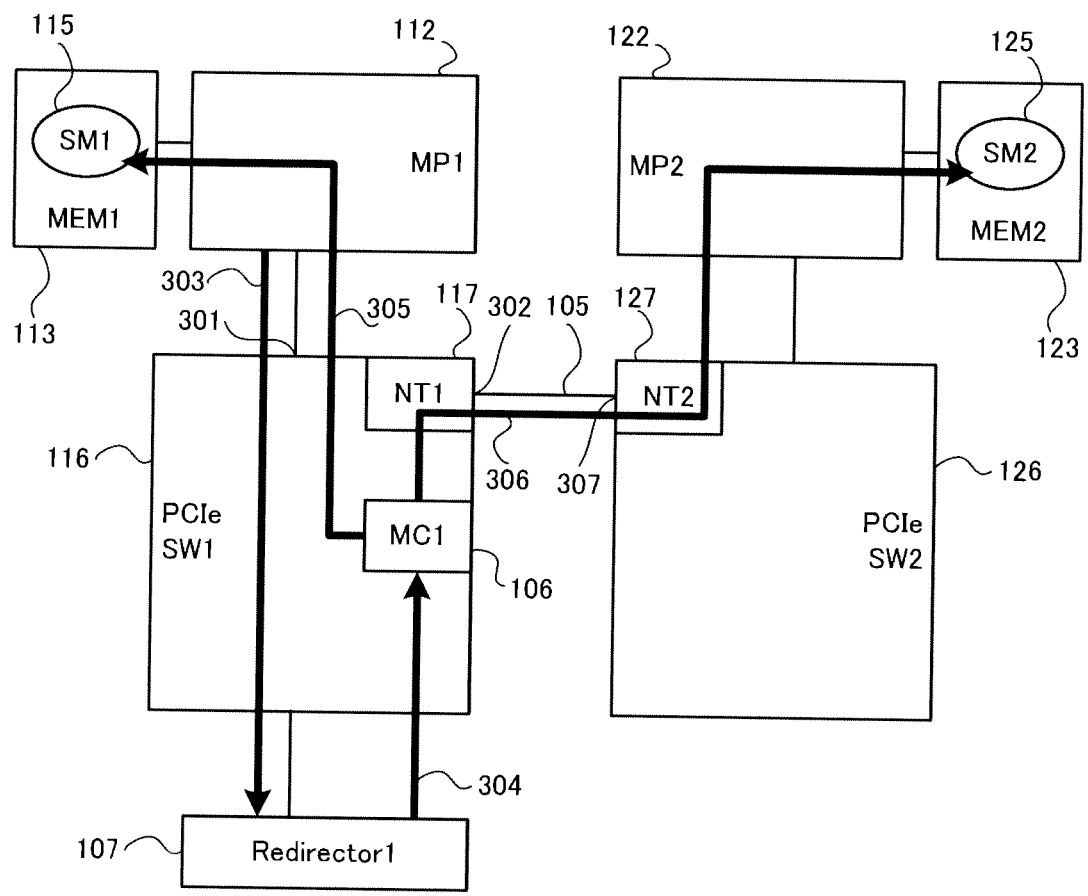
FIG. 3 is a view showing a data transfer path for writing data from the processors to the shared memories according to embodiment 1.

FIG. 3 is a view showing a data transfer path when a packet redirector 107 (Redirector1) is coupled to a switch 116 (SW1) so as to avoid the above limitation. As described, the multicast function of the switch does not operate in the direction of the port through which the packet has entered. Therefore, according to the storage subsystem of embodiment 1, as shown in FIG. 3, a packet redirector 107 (Redirector1) is coupled to the switch 116 (SW1), and the packet transmitted from the processor 112 (MP1) is redirected to be transferred to the multicast function 106 (MC1) of the switch.

In switch 116 (SW1), the processor 112 (MP1) coupled to the upstream port 301 and the non-transparent bridge 117 (NT1) are set within the same multicast group. Further, the packet redirector 107 (Redirector1) transfers the received packet to the multicast address (referred to as multicast address 1) of that group.

When writing data from the processor 112 (MP1) to the shared memories 115 (SM1) and 125 (SM2), at first, the processor 112 (MP1) sends the packet storing the write data to the shared memories to the packet redirector 107 (Redirector1) (reference number 303). The packet redirector 107 (Redirector1) transfers the received packet to the multicast address 1 of the switch 116 (SW1) (reference number 304.) The multicast function 106 of the switch 116 (SW1) copies the received packet.

One of the copied packets is sent via a port 301 and the processor 112 (MP1) to the shared memory 115 (SM1) within the main memory 113 (MEM1) (reference number 305). The other one of the copied packets is sent via a port 302 coupled to the non-transparent bridge 117 (NT1), an NT link 105, a port 307 of the switch 126 (SW2), a non-transparent bridge 127 (NT2) and the processor 122 (MP2) to the shared memory 125 (SM2) within the main memory 123 (MEM2) (Reference number 306).

Figure 4:
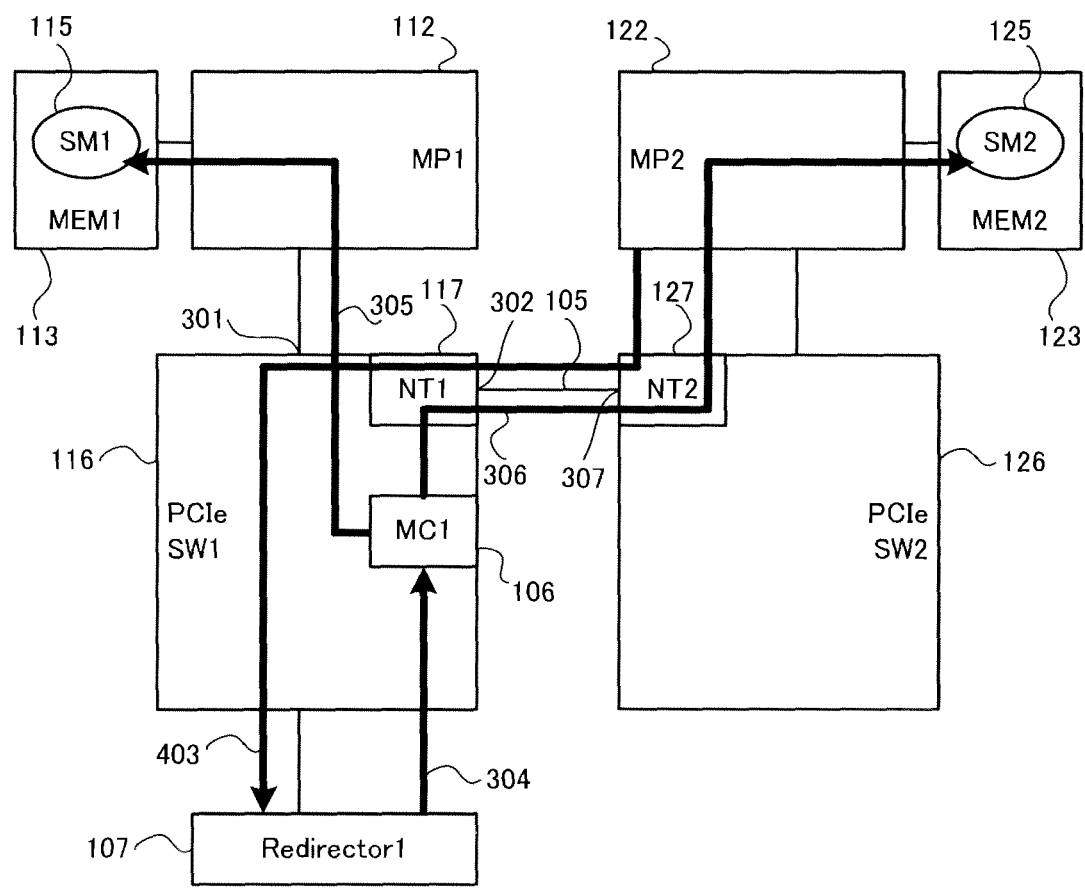
FIG. 4 is a view showing a data transfer path for writing data from the processors to the shared memories according to embodiment 1.

FIG. 4 is a view showing a data transfer path from the processor 122 (MP2) to the shared memories 115 (SM1) and 125 (SM2). Upon writing data from the processor 122 (MP2) to the shared memories 115 (SM1) and 125 (SM2), the processor 122 (MP2) sends a packet storing the write data to the shared memory to the packet redirector 107 (Redirector1), similar to the processor 112 (MP1) (reference number 403).

The data transfer path passes the non-transparent bridge 127 (NT2), the port 307, the NT link 105, the port 302 and the non-transparent bridge 117 (NT1). The packet redirector 107 (Redirector1) transfers the received packet to the multicast address 1 of the switch 116 (SW1) (reference number 304). The multicast operation performed thereafter is similar to the operation of writing data from the processor 112 (MP1).

As described, the packet sent from the processor 112 (MP1) and the packet sent from the processor 122 (MP2) are both copied via the same multicast function 106 (MC1) and sent to the shared memories 115 and 125 (SM1 and SM2). The multicast function 106 (MC1) sends the copied packet to the shared memories in the same order as the order in which the packets were received. Therefore, the order of writing of the packets are consistent in both the shared memories 115 (SM1) and 125 (SM2).

Figure 5:
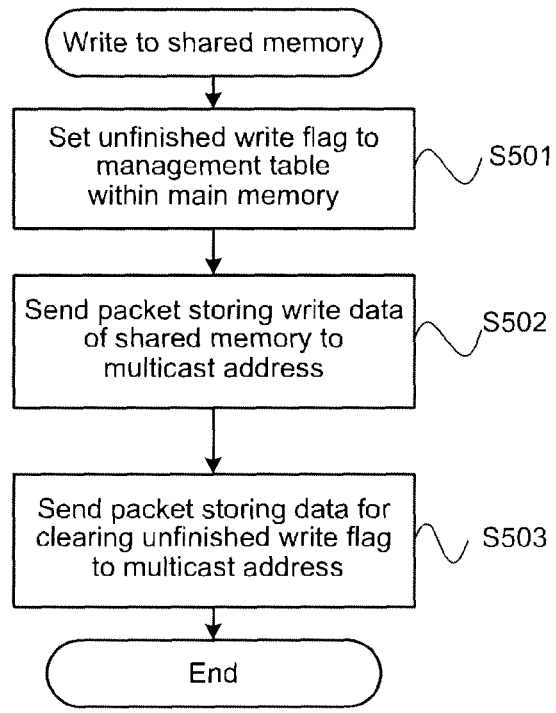
FIG. 5 is a flowchart showing the writing of data from the processors to the shared memories according to embodiment 1.
Figure 6:
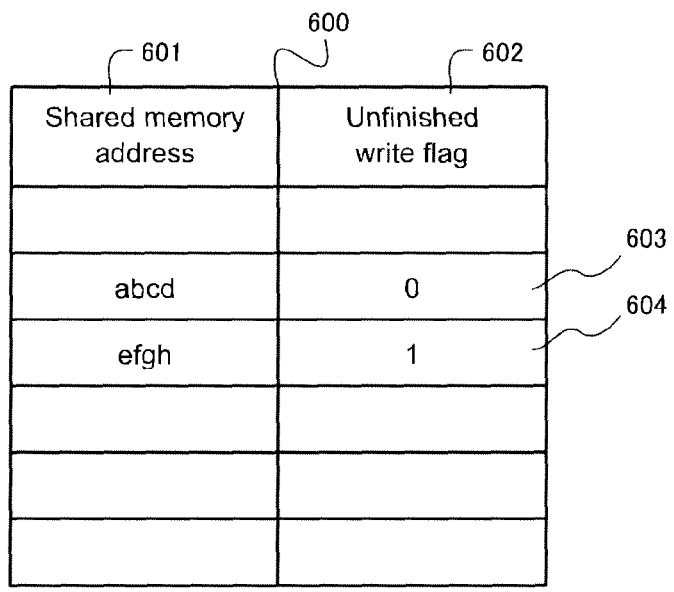
FIG. 6 is a shared memory management table according to embodiment 1.
Figure 7:
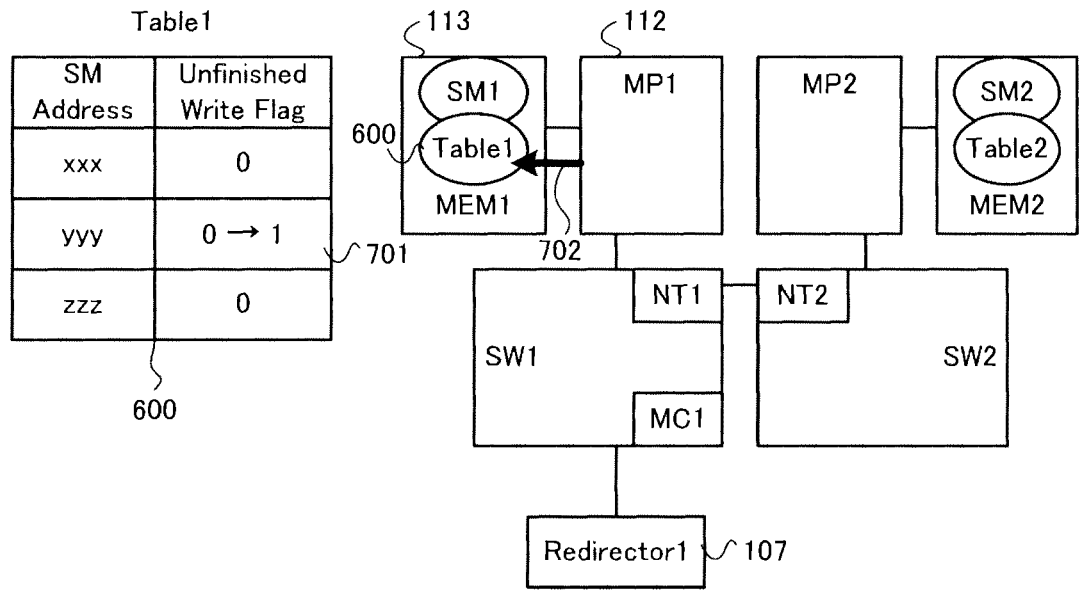
FIG. 7 is a view showing an operation of writing data from the processors to the shared memories according to embodiment 1.
Figure 8:
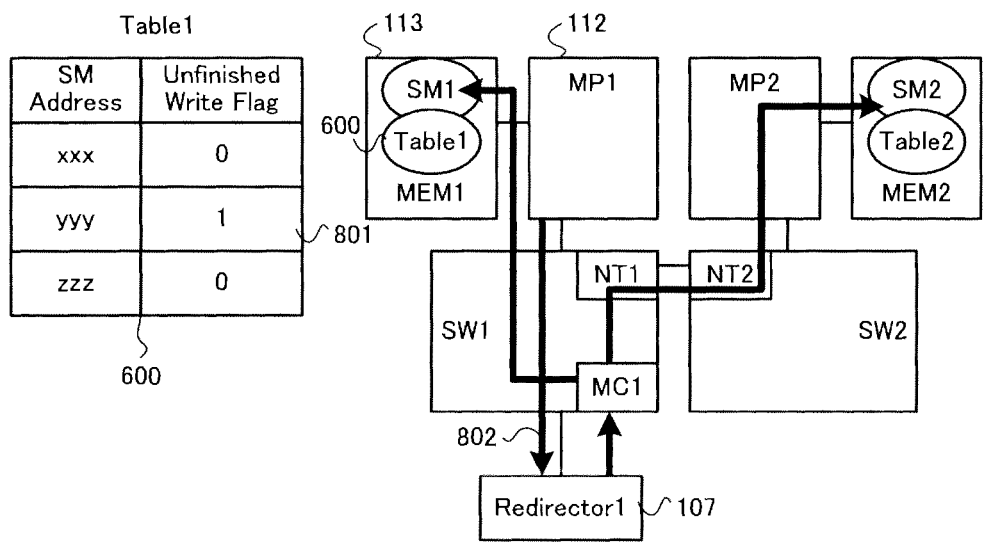
FIG. 8 is a view showing an operation of writing data from the processors to the shared memories according to embodiment 1.
Figure 9:
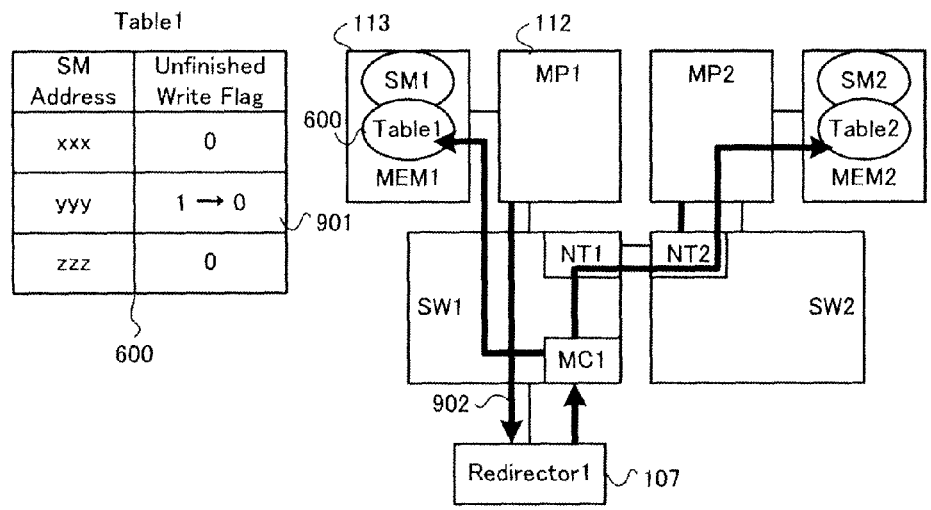
FIG. 9 is a view showing an operation of writing data from the processors to the shared memories according to embodiment 1.

The process for writing data from the processor 112 (MP1) to the shared memories 115 (SM1) and 125 (SM2) will be described with reference to FIGS. 5 through 9. FIG. 5 is a flowchart of the order for writing data. FIG. 6 is a view showing a shared memory management table 600 stored in the main memory 113 (MEM1) that the processor 112 (MP1) uses for writing data into the shared memories. FIGS. 7 through 9 are views showing the contents of the data transfer path of the write data packets to the shared memories and the contents of the shared memory management table 600 corresponding to the respective steps of the flowchart of FIG. 5.

In FIG. 6, the shared memory management table 600 stores an unfinished write flag 602 with respect to a shared memory address 601. If the unfinished write flag is "0", it means that the writing of data to that shared memory address is completed. On the other hand, if the unfinished write flag is "1", it means that the writing of data to the shared memory address is not completed.

For example, according to FIG. 6, since the unfinished write flag of shared memory address "abcd" is "0" (reference number 603), the writing of data to that address is completed. On the other hand, if the unfinished write flag of shared memory address "efgh" is "1" (reference number 604), it means that the writing of data to that address is not completed.

In step S501 of the flowchart of FIG. 5, the processor 112 (MP1) writes "1" to the unfinished write flag of the write destination shared memory address in the shared memory management table 600 within the main memory 113 (MEM1). In that case, as shown in FIG. 7, the processor 112 (MP1) directly accesses the main memory 113 (MEM1) (reference number 702) and updates the shared memory management table 600. The unfinished write flag of the write destination address of the shared memory management table 600 is updated from "0" to "1" (reference number 701).

Next, in step S502, the processor 112 (MP1) sends the packet storing the write data to the shared memory to the packet redirector 107 (Redirector1) as shown in FIG. 8 (reference number 802). The packet redirector 107 (Redirector1) sends the packet to the multicast address 1 of the switch 116 (SW1). In this case, the unfinished write flag of the write destination address in the shared memory management table 600 is "1", indicating that writing of data is not completed (reference number 801).

Thereafter, in step S503, the processor 112 (MP1) sends the packet storing the data clearing the unfinished write flag of the shared memory management table 600 via the same path as the write data packet sent to the shared memory as shown in FIG. 9 (reference number 902). In other words, the packet clearing the flag is transmitted via the packet redirector 107 (Redirector1) to the multicast address 1 of the switch 116 (SW1).

As a result, the unfinished write flag of the write destination address of the shared memory management table 600 is updated from "1" to "0" (reference number 901). Also regarding the shared memory 125 (SM2), the packet clearing the flag is subjected to multicast, but the processor 122 (MP2) is not writing data in a target address, so it is not influenced.

Figure 10:
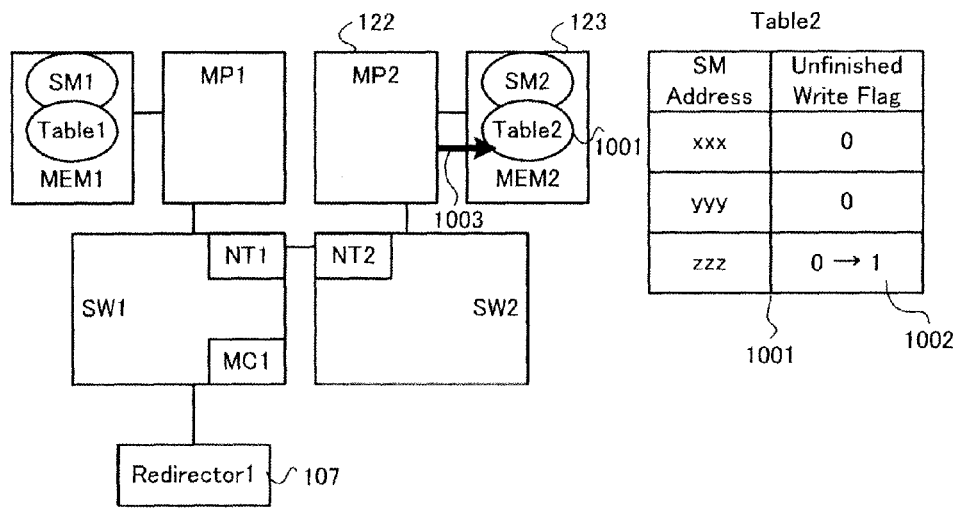
FIG. 10 is a view showing an operation of writing data from the processors to the shared memories according to embodiment 1.
Figure 11:
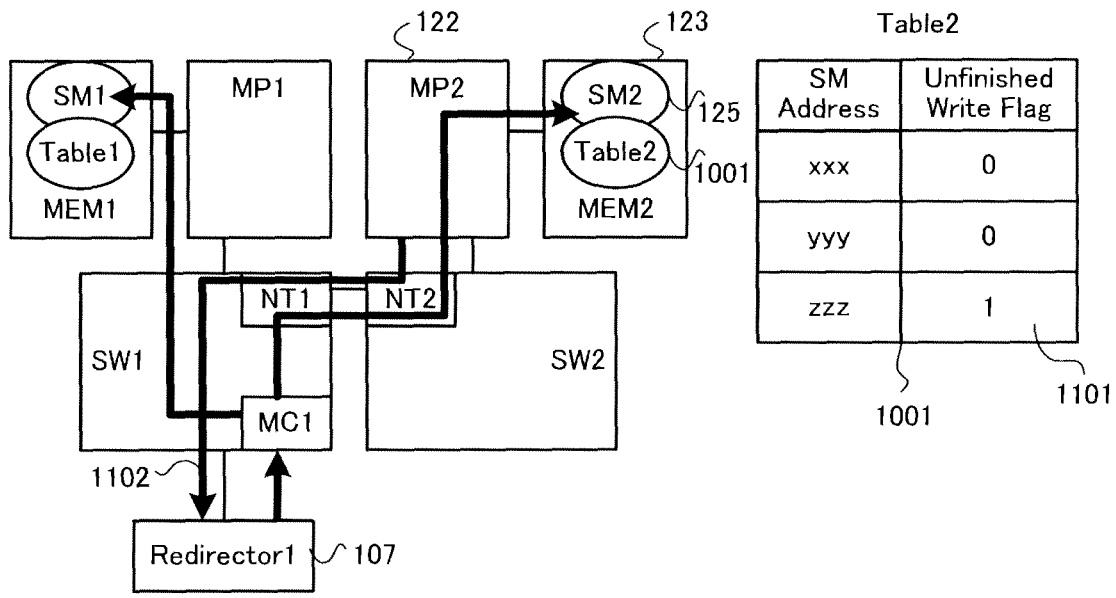
FIG. 11 is a view showing an operation of writing data from the processors to the shared memories according to embodiment 1.
Figure 12:
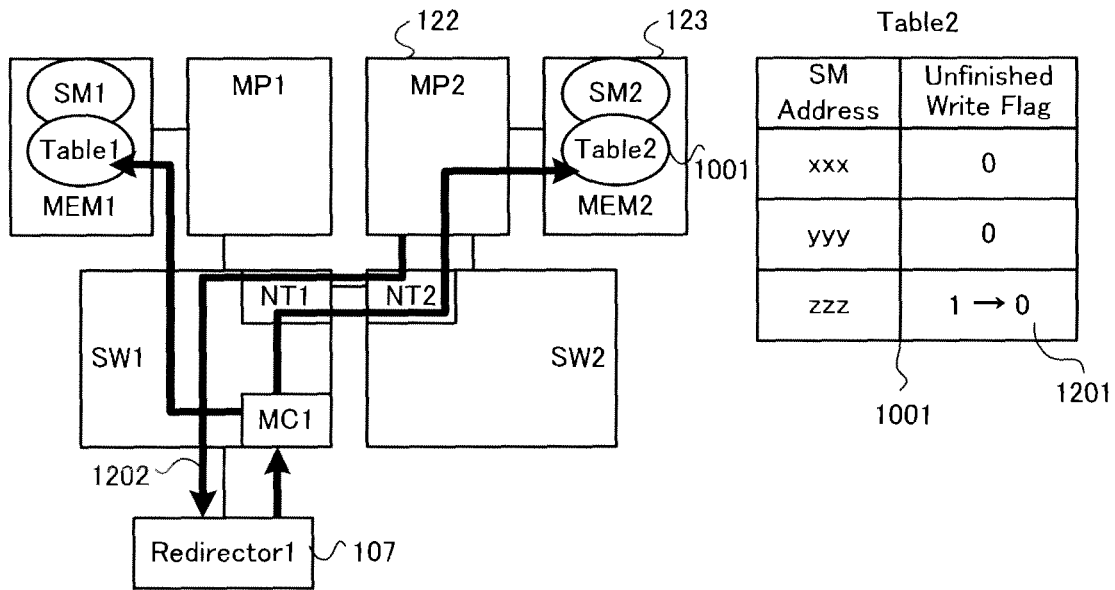
FIG. 12 is a view showing an operation of writing data from the processors to the shared memories according to embodiment 1.

FIGS. 10 through 12 are views showing the procedure of writing data from the processor 122 (MP2) to the shared memories 115 and 126 (SM1 and SM2). The procedure of writing data from the processor 122 (MP2) to the shared memory also follows the flowchart of FIG. 5.

In step S501 of the flowchart of FIG. 5, the processor 122 (MP2) writes "1" to the unfinished write flag of the write destination shared memory address in the shared memory management table 1001. In this case, as shown in FIG. 10, the processor 122 (MP2) directly accesses the main memory 123

(MEM2) (reference number 1003) and updates the shared memory management table 1001. The unfinished write flag of the write destination address of the shared memory management table 1001 is updated from "0" to "1" (reference number 1002).

Next, in step S502, the processor 122 (MP2) transmits the packet storing the data to be written to the shared memory to the packet redirector 107 (Redirector1) as shown in FIG. 11 (reference number 1102). Then, the packet redirector 107 (Redirector1) transmits the packet to the multicast address 1 of the switch 116 (SW1). At this time, the unfinished write flag of the write destination address of the shared memory management table 1001 is "1", indicating that the write is not finished (reference number 1101).

Next, in step S503, the processor 122 (MP2) transmits the packet storing the data clearing the unfinished write flag of the shared memory management table 1001 via the same path as the packet storing the write data sent to the shared memory, as shown in FIG. 12 (reference number 1202). That is, the packet clearing the flag is sent via the packet redirector 107 (Redirector1) to the multicast address 1 of the switch 116 (SW1).

As a result, the unfinished write flag of the write destination address of the shared memory management table 1001 is updated from "1" to "0" (reference number 1201). The packet for clearing the flag is also sent via multicast to the shared memory 115 (SM1), but since the processor 112 (MP1) is not writing data to the target address, it will not be influenced.

As described, according to embodiment 1 of the present invention, compared to the case where each processor writes data directly to the main memory, the length of the data path through which the packet storing the shared memory write data is transmitted becomes longer, so that the write time is elongated. Therefore, it may be possible that the data the processor attempts to read from the shared memory may still be in the middle of a writing operation.

Thus, by utilizing an unfinished write flag, the processors 122 (MP1) and 122 (MP2) can check the status of the writing operation to the shared memories 115 (SM1) and 125 (SM2). Next, we will describe the procedure of reading data from the shared memory.

The procedure for reading data from the shared memories 115 (SM1) and 125 (SM2) to the processors 112 (MP1) and 122 (MP2) will be described with reference to FIGS. 13 through 17.

Figure 13:
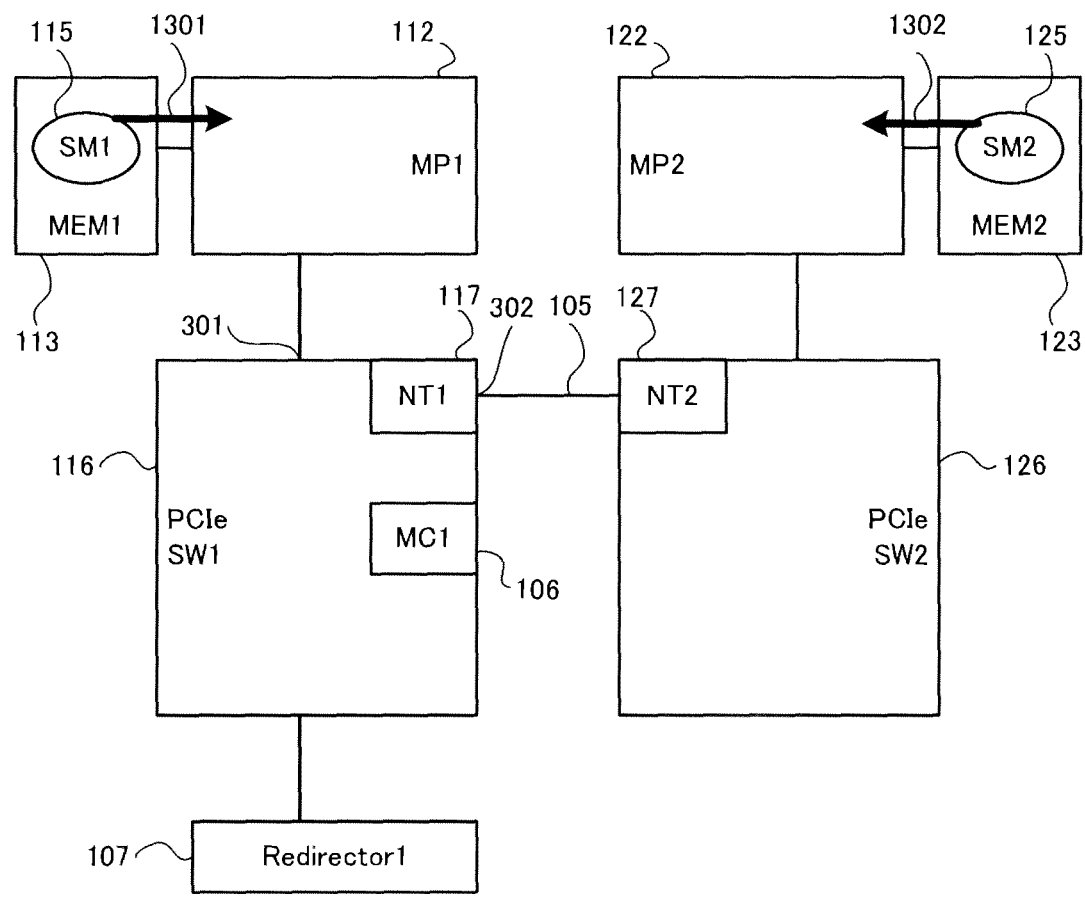
FIG. 13 is a view showing a data transfer path of the data read from the shared memories to the processors according to embodiment 1.

FIG. 13 is a view showing a data transfer path used for reading data from the shared memories 115 (SM1) and 125 (SM2) to processors 112 (MP1) and 122 (MP2). As described, the contents of the data stored in the shared memories 115 (SM1) and 125 (SM2) are consistent, including the writing order of the data.

Therefore, the processors 112 (MP1) and 122 (MP2) can read data from the shared memories by accessing the respective main memories 113 (MEM1) and 123 (MEM2). In other words, as shown in FIG. 13, the processor 112 (MP1) directly accesses the shared memory 115 (SM1) (reference number 1301) and the processor 122 (MP2) directly accesses the shared memory 125 (SM2) (reference number 1302).

Figure 14:
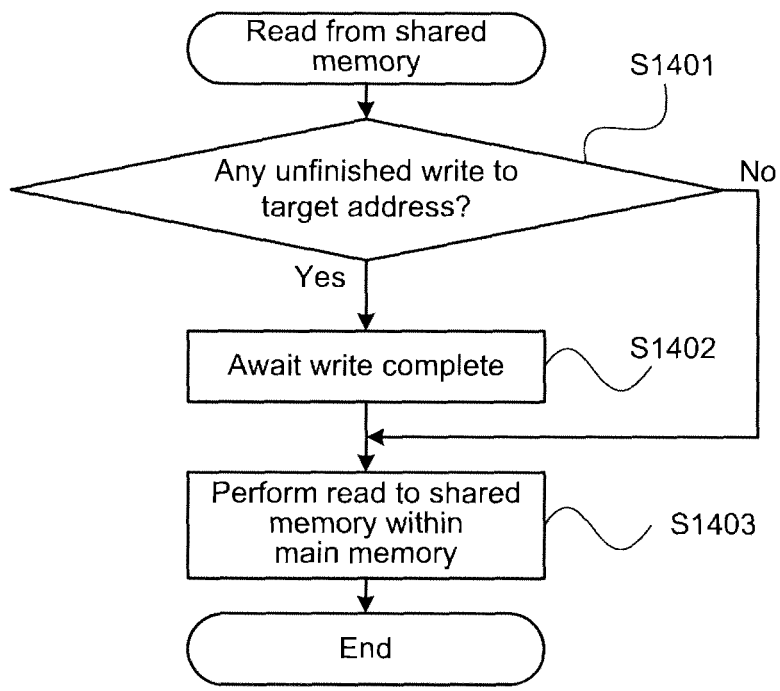
FIG. 14 is a view showing a flowchart of reading data from the shared memories to the processors according to embodiment 1.
Figure 15:
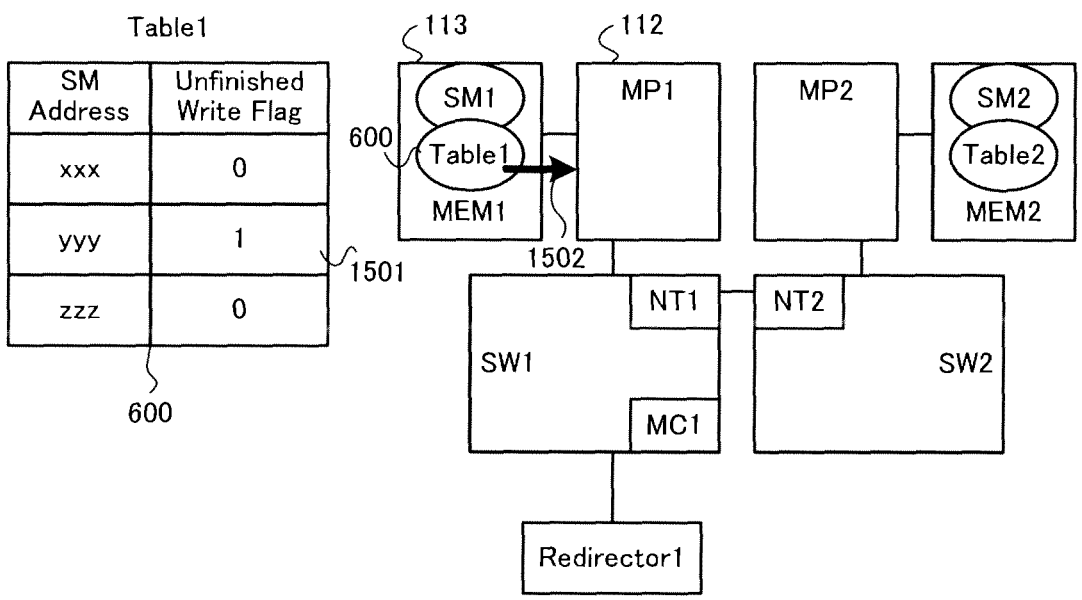
FIG. 15 is a view showing an operation of reading data from the shared memories to the processors according to embodiment 1.
Figure 16:
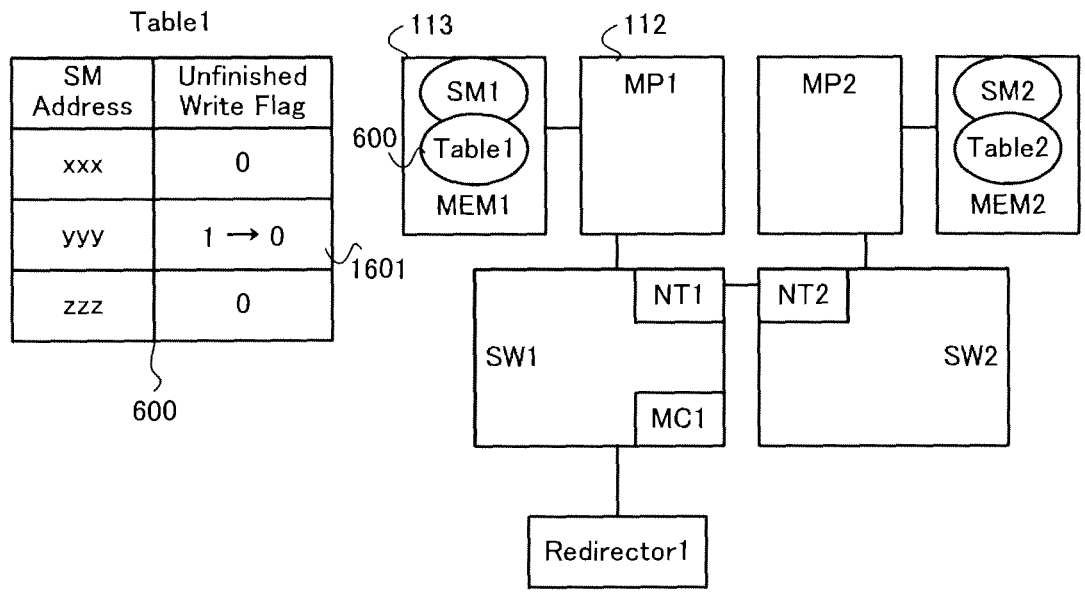
FIG. 16 is a view showing an operation of reading data from the shared memories to the processors according to embodiment 1.
Figure 17:
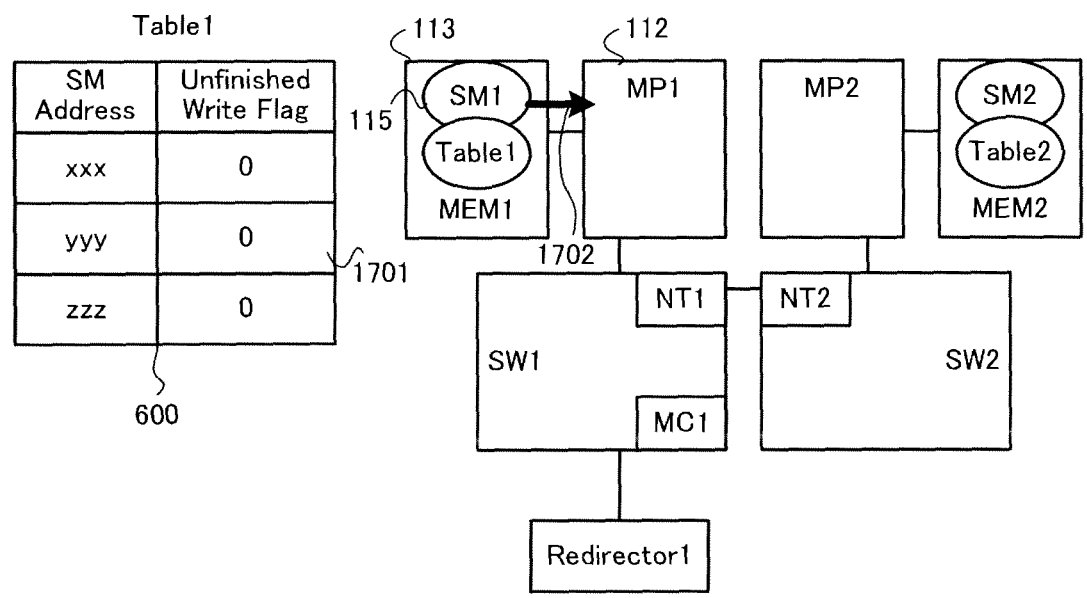
FIG. 17 is a view showing an operation of reading data from the shared memories to the processors according to embodiment 1.

The procedure for reading data from the shared memory 115 (SM1) to the processor 112 (MP1) will be described with reference to FIGS. 14 through 17. FIG. 14 is a flowchart of the reading procedure. The reading procedure from the shared memory 125 (SM2) to the processor 122 (MP2) also follows the flowchart of FIG. 14. Regarding reading of data, similar to writing data to the shared memory, the shared memory management table 600 stored in the main memory 113 (MEM1) of FIG. 6 is used. FIGS. 15 through 17 are drawings showing the data transfer path of the read packet from the shared memory and the contents of the shared memory management table 600 corresponding to each step of the flowchart of FIG. 14.

In step S1401 of the flowchart of FIG. 14, the processor 112 (MP1) reads the unfinished write flag of the read destination shared memory address from the shared memory management table 600. In this case, as shown in FIG. 15, the processor 112 (MP1) directly accesses the main memory 113 (MEM1) (reference number 1502), and reads the unfinished write flag (reference number 1501) from the shared memory management table 600. The processor 112 (MP1) determines whether the unfinished write flag of the write destination address is "0" or "1", that is, whether the write operation is finished or not finished. If the unfinished write flag is "0" (write finished), the procedure advances to step S1403, and if the unfinished write flag is "1" (write unfinished), the procedure advances to step S1402.

Next, in step S1402, the processor 112 (MP1) awaits the unfinished write flag of the read destination address in the shared memory management table 600 from being updated from "1" to "0" (reference number 1601 of FIG. 16).

Next, in step S1403, the processor 112 (MP1) having detected the update of the unfinished write flag of the read destination address to "0" (write finished) (reference number 1701 of FIG. 17) reads the desired data from the shared memory 115 (SM1). At this time, the processor 112 directly accesses the shared memory 115 (SM1) within the main memory 113 (MEM1) as shown in FIG. 17 (reference number 1702).

As described, according to the storage subsystem of embodiment 1 of the present invention, the contents of the two shared memories 115 (SM1) and 125 (SM2) stored in each of the main memories 113 (MEM1) and 123 (MEM2) of the two processors 112 (MP1) and 122 (MP2) can be made consistent including the data write order. Further, when reading data from the shared memories 115 (SM1) and 125 (SM2) to the processors 112 (MP1) and 122 (MP2), the data in the shared memories can be read by accessing the main memory of each processor, so that the access time can be shortened.

Actually, the processor 122 (MP2) according to the prior art had to read the contents of the shared memory 115 (SM1) stored in the main memory 113 (MEM1). Therefore, it was necessary to perform operations such as the transmission of a request of an alternate read processing to the processor 112 (MP1), the reading of the contents of the shared memory 115 (SM1) via the processor 112 (MP1), and the transmission of the read data to the processor 122 (MP2).

The total time required for such operation is approximately 1000 nsec, including the propagation delay time in the switch (approximately 200 nsec/switch×4 switches (to-and-fro of switch 116 and switch 126)) and the read time of the contents of the shared memory 115 (SM1) (approximately 200 nsec). On the other hand, since according to the present invention the processor 122 (MP2) directly reads the contents of the shared memory 125 (SM2) stored in the main memory 123 (MEM2) to acquire the desired data, the required time can be shortened to one-fifth, approximately 200 nsec.

Embodiment 2

Now, a storage subsystem according to embodiment 2 and the operation thereof will be described with reference to FIGS. 18 through 20. Embodiment 2 characterizes in that the switch 126 (SW2) also has a multicast function 1806, and that by coupling a packet redirector 1807 (Redirector2) to the switch 126 (SW2), it becomes possible to share the load of writing data to the two shared memories 115 (SM1) and 125 (SM2) among two switches. However, as for the control information requiring consistency of writing order, the same multicast function is used to write data to the shared memories.

In the switch 126 (SW2), the processor 122 (MP2) (in detail, the Root Complex (not shown) included in the processor) coupled to an upstream port 1801 and the non-transparent bridge 127 (NT2) are set in the same multicast group. Further, the packet redirector 1807 (Redirector2) transfers the received packet to the multicast address of that group (which is multicast address 2).

Figures 18, 19:
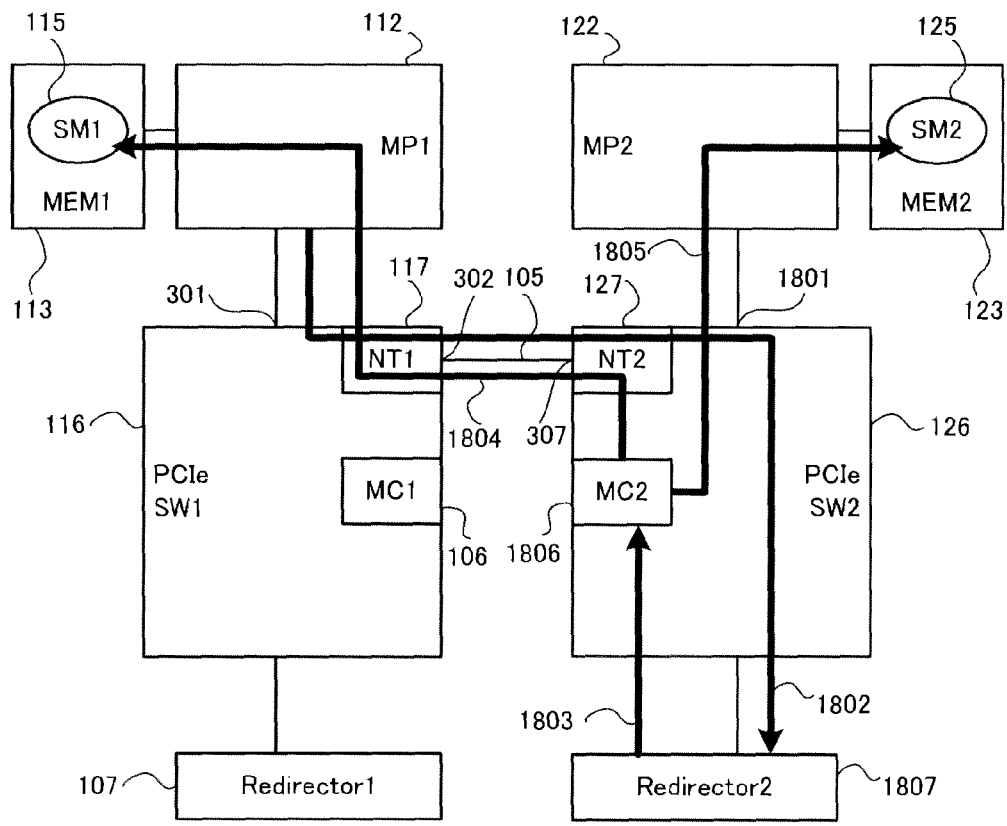
FIG. 18 is a view showing a data transfer path for writing data from the processors to the shared memories in a storage subsystem according to embodiment 2.
FIG. 19 is a view showing a shared memory management table according to embodiment 2.

FIG. 18 shows a data transfer path through which the processor 112 (MP1) sends a packet to a multicast function 1806 (MC2) of switch 126 (SW2) via an NT link 105 and a packet redirector 1807 (Redirector2).

The data transfer path through which the processor 112 (MP1) sends a packet to the shared memories 115 (SM1) and 125 (SM2) using a multicast function 106 (MC1) is illustrated in FIG. 3.

The data transfer path through which the processor 122 (MP2) sends a packet to the shared memories 115 (SM1) and 125 (SM2) using a multicast function 106 (MC1) is illustrated in FIG. 4.

The data transfer path through which the processor 122 (MP2) sends a packet to the shared memories 115 (SM1) and 125 (SM2) using the multicast function 1806 (MC2) is equivalent to FIG. 3 by replacing the processor 112 (MP1) with the processor 122 (MP2) and the multicast function 106 (MC1) with the multicast function 1806 (MC2).

FIG. 19 is a view showing a shared memory management table according to embodiment 2. In FIG. 19, the shared memory management table 1900 stores a send destination multicast information 1905 corresponding to a shared memory address 1901 and an unfinished write flag 1902. If the send destination multicast information is "0", the processor 112 (MP1) sends a packet to the shared memories 115 (SM1) and 125 (SM2) using the multicast function 106 (MC1) of the switch 116 (SW1). In contrast, if the send destination multicast information is "1", the processor 112 (MP1) sends a packet to the shared memories 115 (SM1) and 125 (SM2) using the multicast function 1806 of the switch 126 (SW2).

If the unfinished write flag is "0", it means that the writing of data to that shared memory address is finished. In contrast, if the unfinished write flag is "1", it means that the writing of data to that shared memory address is unfinished. For example, in FIG. 19, since the unfinished write flag of shared memory address "abcd" is "0" (reference number 1903), the writing of data to that address is finished. On the other hand, since the unfinished write flag of shared memory address "efgh" is "1" (reference number 1904), the writing to that address is unfinished.

Figure 20:
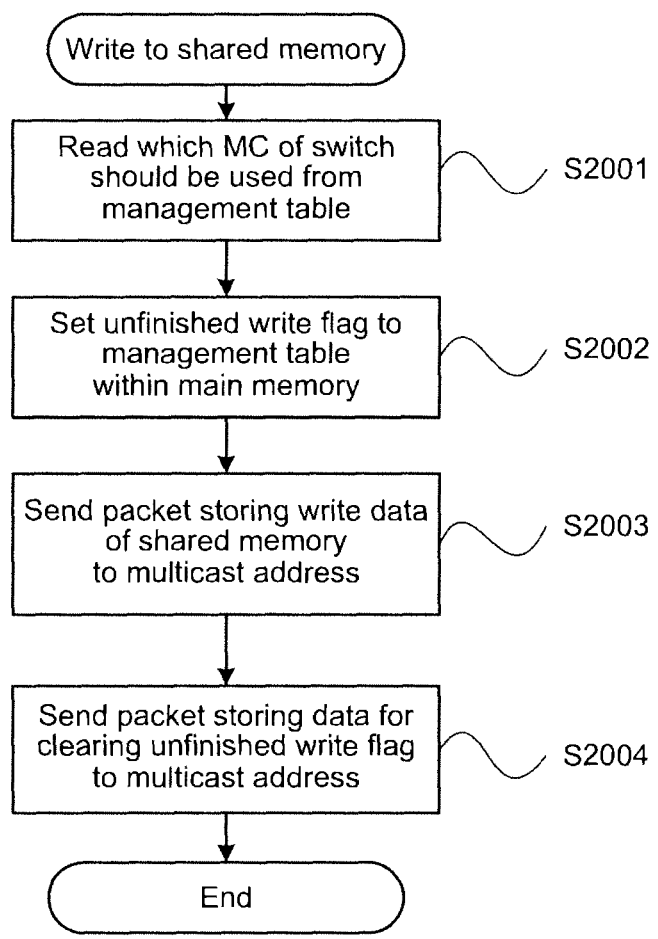
FIG. 20 is a view showing a flowchart for writing data from the processors to the shared memories according to embodiment 2.

FIG. 20 shows a flowchart of writing data from the processor to the shared memories according to embodiment 2. In step S2001 of the flowchart of FIG. 20, the processor 112 (MP1) reads a send destination multicast information of the write destination shared memory address from the shared memory management table 1900. According to the send destination multicast information being read, the processor 112 (MP1) determines whether the packet storing the write data to the shared memories should be sent to the packet redirector 107 (Redirector1) or the packet redirector 1807 (Redirector2). Upon transmitting the packet to the packet redirector 107 (Redirector1), the multicast function 106 subjects the packet storing the write data to the shared memories to multicast. Upon transmitting the packet to the packet redirector 1807 (Redirector2), the multicast function 1806 subjects the packet storing the write data to the shared memories to multicast.

Next, in step S2002, the processor 112 (MP1) writes "1" to the unfinished write flag of the write destination shared memory address in the shared memory management table 1900.

Next, in step S2003, the processor 112 (MP1) sends the packet storing the write data to the shared memories based on the send destination multicast information read in step S2001. That is, the processor 112 (MP1) sends the packet to the multicast group address of the multicast function 106 (MC1) if the send destination multicast information is "0" and to the multicast group address of the multicast function 1806 (MC2) if the information is "1".

Next, in step S2004, the processor 112 (MP1) sends the packet storing data for clearing the unfinished write flag 1902 of the shared memory management table 1900 via the same path as the packet storing the write data sent to the shared memories.

Through the data transfer path mentioned above, the processors 112 (MP1) and 122 (MP2) can send packets storing write data to the shared memories using multicast function 106 (MC1) or the multicast function 1806 (MC2) to the shared memories 115 (SM1) and 125 (SM2).

Embodiment 3

Figure 21:
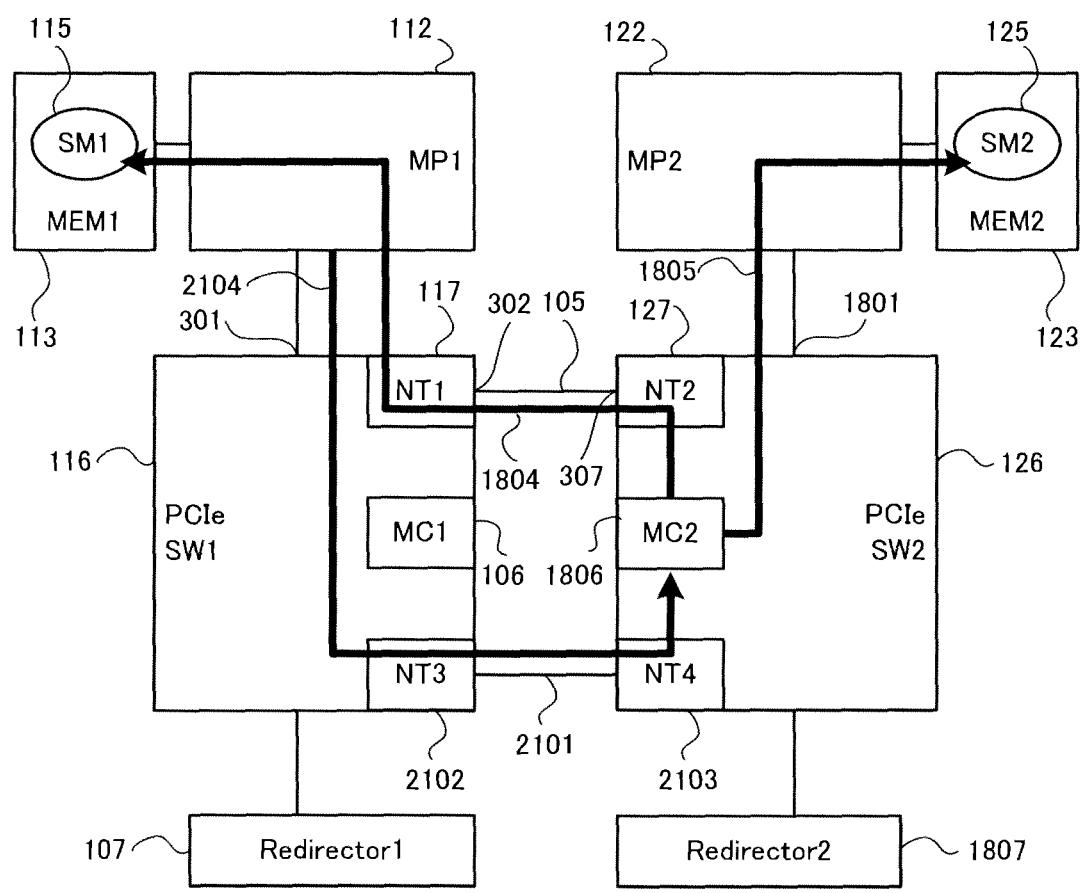
FIG. 21 is a view showing a data transfer path for writing data from the processors to the shared memories in a storage subsystem according to embodiment 3.
Figure 22:
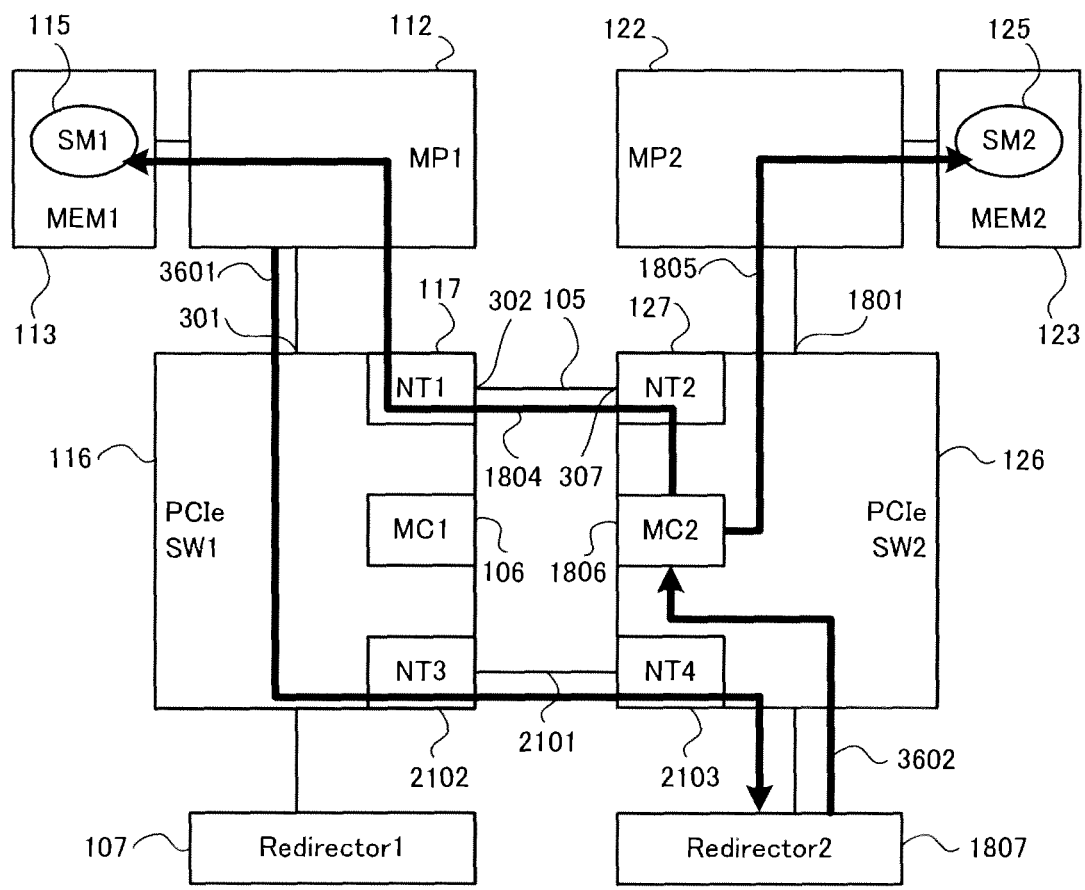
FIG. 22 is a view showing a data transfer path for writing data from the processors to the shared memories in a storage subsystem according to embodiment 3.
Figure 23:
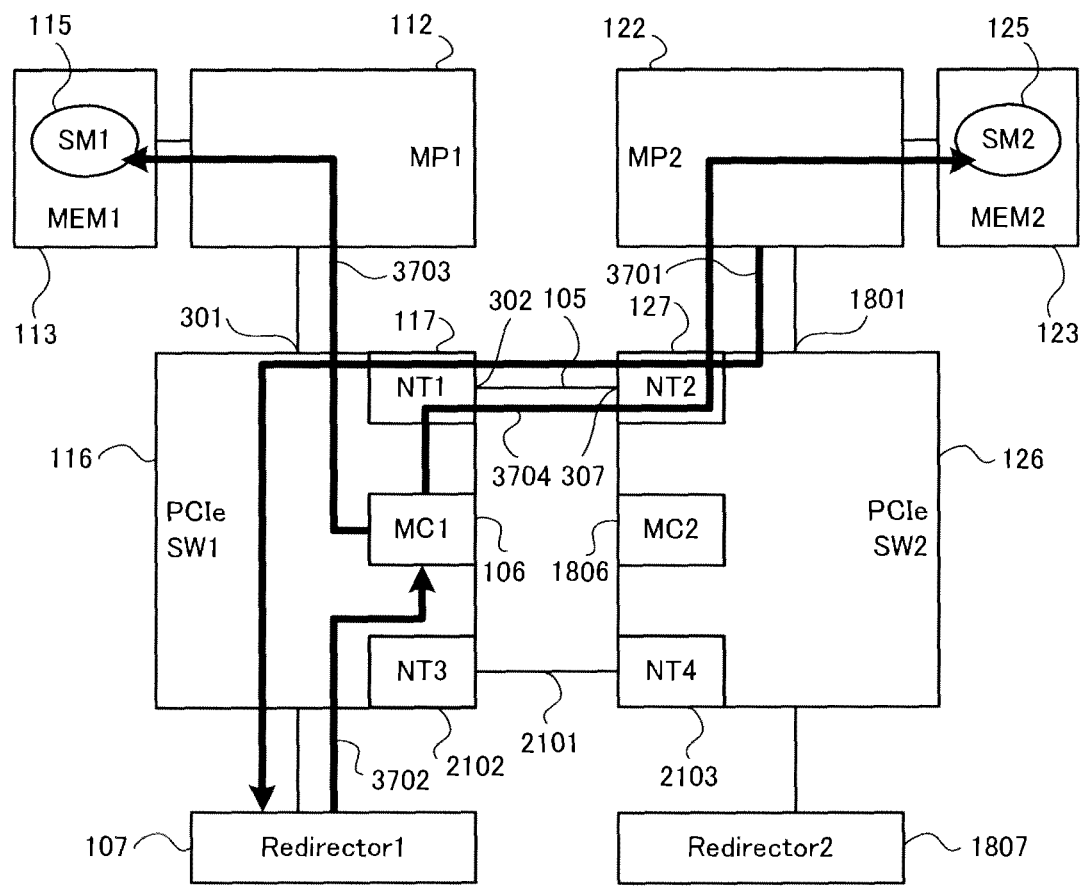
FIG. 23 is a view showing a data transfer path for writing data from the processors to the shared memories in the storage subsystem according to embodiment 3.

FIGS. 21 through 23 are views showing a write data transfer path from the processes to the shared memories of the storage subsystem according to embodiment 3. Now, the storage subsystem according to embodiment 3 will be described with reference to FIGS. 21 through 23. In contrast to embodiment 2, embodiment 3 characterizes in coupling switches using two NT links.

<First Example of Writing Data to Shared Memories Using Two NT Links>

In contrast to the configuration of FIG. 18, according to FIG. 21, the switch 116 (SW1) has a non-transparent bridge 2102 (NT3) and the switch 126 (SW2) has a non-transparent bridge 2103 (NT4), respectively. The non-transparent bridge 2102 (NT3) and the non-transparent bridge 2103 (NT4) are coupled via an NT link 2101. Similar to embodiment 2, in the switch 126 (SW2), the processor 122 (MP2) coupled to the upstream port 1801 and the non-transparent bridge 127 (NT2) are set in the same multicast group.

Upon writing data into the shared memories, the processor 112 (MP1) sends the packet storing the write data via an NT link 2101 to the multicast function 1806 (MC2) (reference number 2104). The multicast function 1806 (MC2) having received the packet makes a copy of the received packet, sends the copied packet to the shared memory 115 (SM1) (reference number 1804), and also sends the packet to the shared memory 125 (SM2) (reference number 1805).

In FIG. 18, the processor 112 (MP1) transmits the packet to the shared memories using the packet redirector 1807 (Redirector2) and the multicast function 1806, but in contrast according to FIG. 21, the processor 112 (MP1) uses the NT link 2101 instead of using the packet redirector 1807 (Redirector2) so as to write data into two shared memories.

<Second Example of Writing Data to Shared Memories Using Two NT Links>

FIG. 22 shows a data transfer path in which the processor 112 (MP1) uses a packet redirector 1807 (Redirector2) coupled to the switch 126 (SW2) and a multicast function 1806 (MC2) of the switch 126 (SW2) to write data into the shared memories. The processor 112 (MP1) sends a packet storing the write data to the shared memories via the NT link 2101 to the packet redirector 1807 (Redirector2) (reference number 3601).

The packet redirector 1807 (Redirector2) sends the received packet to the multicast function 1806 (MC2) (reference number 3602). The multicast function 1806 (MC2) sends the received packet to the shared memories 115 (SM1) and 125 (SM2) (reference numbers 1804 and 1805).

Similarly, the processor 122 (MP2) can perform writing of data to the shared memories via the NT link 2101 using the packet redirector 107 (Redirector1) coupled to the switch 116 (SW1) and the multicast function 106 (MC1) of the switch 116 (SW1). When switches are coupled via two NT links as mentioned above, the processor can realize writing of data to two shared memories using the packet redirector disposed opposite thereto via the NT links and the multicast function.

<Distinguished Use of Two NT Links>

FIG. 23 shows a data transfer path for the processor 122 (MP2) to write data into the shared memories using the multicast function 106 (MC1). The processor 122 (MP2) sends a packet via the NT link 105 to the packet redirector 107 (Redirector1) (reference number 3701). The packet redirector 107 (Redirector1) sends the received packet to the multicast function 106 (MC1). The multicast function 106 (MC1) sends the received packet to the shared memories 115 (SM1) and 125 (SM2) (reference numbers 3703 and 3704).

The data transfer path through which the processor 112 (MP1) writes data into the shared memories using the multicast function 106 is similar to FIG. 3, although it is not shown, which uses the NT link 105.

The data transfer path through which the processor 122 (MP2) writes data into the shared memories using the multicast function 1806 (MC2) is not shown, but is similar to the case where the processor 112 (MP1) is replaced with the processor 122 (MP2) in FIG. 3, it uses the NT link 105. That is, the processor 122 (MP2) sends the packet to the packet redirector 1807 (Redirector2). The packet redirector 1807 (Redirector2) sends the received packet to the multicast function 1806 (MC2). The multicast function 1806 (MC2) sends the received packet to the shared memories 115 (SM1) and 125 (SM2).

The data transfer path through which the processor 112 (MP1) writes data into the shared memories using the multicast function 1806 (MC2) is not shown, but it is similar to FIG. 18. In other words, the processor 112 (MP1) sends a packet via the NT link 105 to the packet redirector 1807 (Redirector2). The packet redirector 1807 (Redirector2) sends the received packet to the multicast function 1806 (MC2). The multicast function 1806 (MC2) sends the received packet to the shared memories 115 (SM1) and 125 (SM2).

The data transfer path regarding the four ways in which data is written into the shared memory uses the NT link 105, but it does not use the NT link 2101. Instead, the NT link 2101 is used to transfer the user data stored in the cache memories among clusters. The size of the control information stored in the shared memories is approximately a few bytes, and the size of the user data stored in the cache memories is approximately a few hundred to a few kilo-bytes. Therefore, if the control information and the user data are transferred via the same link, the transfer of data of the control information may have to wait for completion of transfer of the user data. Therefore, the writing of data into the shared memories utilizes the NT link 105, and the transfer of user data among cache memories utilizes the NT link 2101. As described, by distinguishing the use of two NT links, the time required for writing data into the shared memories can be shortened.

Embodiment 4

Now, the storage subsystem according to embodiment 4 will be described with reference to FIGS. 24 through 27.

Figure 24:
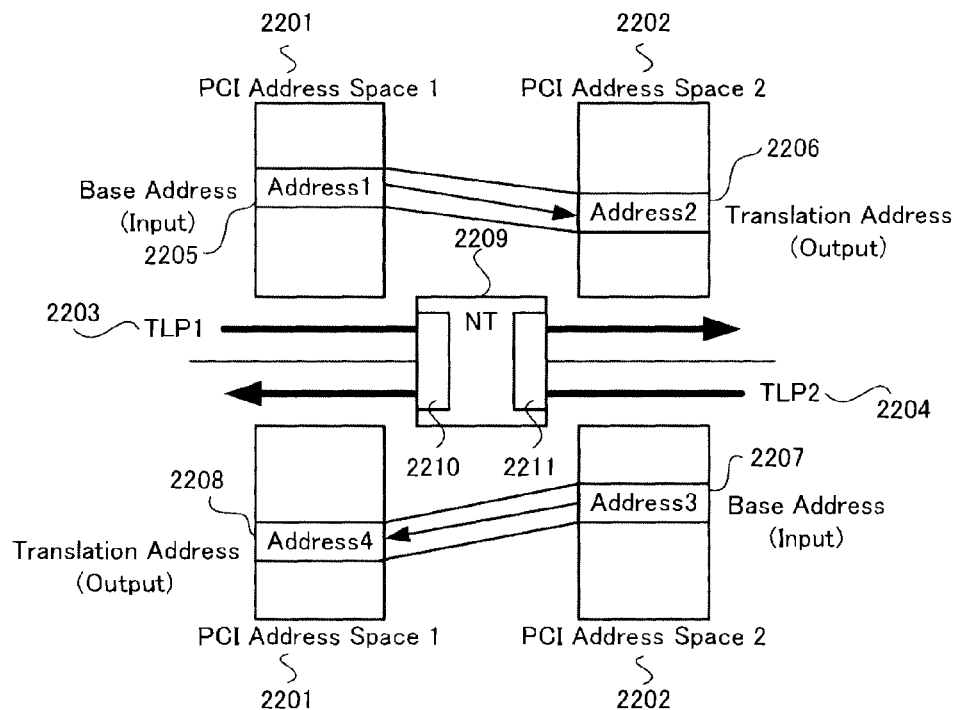
FIG. 24 is a view showing the operation of a non-transparent bridge according to embodiment 4.

FIG. 24 is a view describing the operation of a non-transparent bridge. A non-transparent bridge 2209 includes two Endpoints 2210 and 2211. An Endpoint 2210 belongs to a PCI address space 2201, and an Endpoint 2211 belongs to a PCI address space 2202. The non-transparent bridge 2209 is equipped with an address window 2205 specified by a base address of Endpoint 2210 and an address window 2207 specified by a base address of Endpoint 2211 for allowing a packet to pass there through.

In the PCI address space 2201, a packet 2203 (TLP1) is transmitted to an address (Address1) within the address window 2205 of Endpoint 2210 in which a requester of a processor and the like becomes a completer. Similarly, in the PCI address space 2202, a packet 2204 (TLP2) is transmitted to an address (Address3) within the address window 2207 of Endpoint 2211 in which a requester of a processor and the like becomes a completer.

The non-transparent bridge 2209 translates the transmission destination address of packets 2203 (TLP1) and 2204 (TLP2) passing through the non-transparent bridge 2209 between two PCI address spaces 2201 and 2202. For example, the transmission destination address Address1 within the PCI address space 2201 of the packet 2203 (TLP1) is translated to the address (Address2) within the PCI address space 2202. The transparent bridge is a bridge capable of having the received packet pass as it is, as mentioned earlier.

Further, the non-transparent bridge 2209 translates the transmission destination address (Address3) within the PCI address space 2202 of the packet 2204 (TLP2) traveling in the opposite direction from the packet 2203 (TLP1) to the address (Address4) within the PCI address space 2201.

Figure 25:
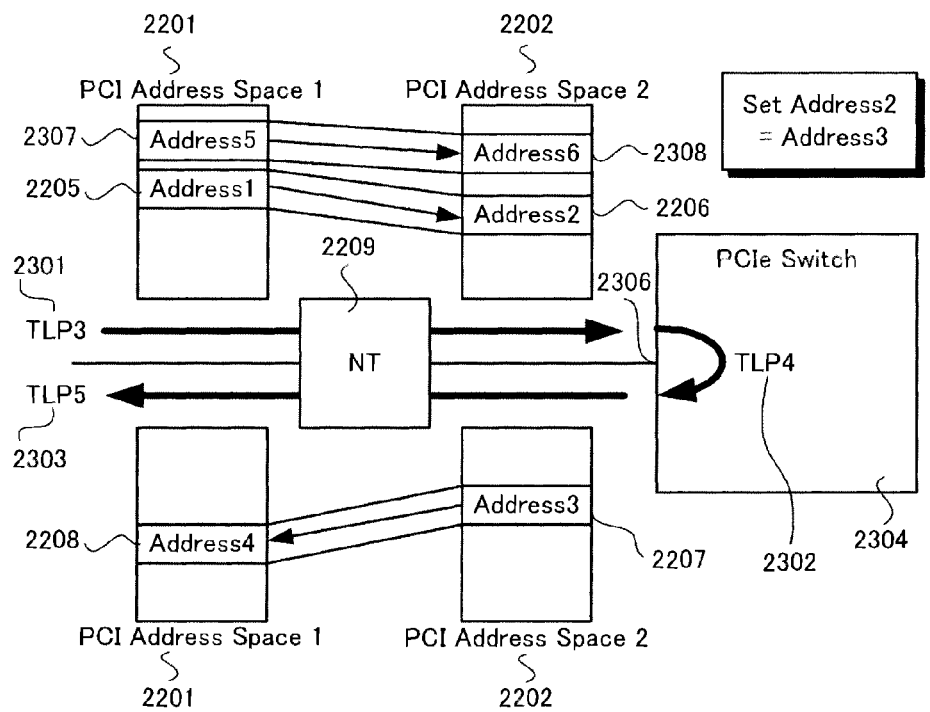
FIG. 25 is a view showing a configuration example of a packet redirector composed of a non-transparent bridge and a switch according to embodiment 4.

FIG. 25 is a view showing the method for realizing a packet redirector combining a non-transparent bridge and a switch. As described with reference to FIG. 2, the PCI Express switch performs routing according to the transmission destination address of the packet. Therefore, as shown in FIG. 25, a non-transparent bridge 2209 and a port 2306 of a switch 2304 are coupled. Further, a translation address and a base address of the non-transparent bridge are set equal, in other words, an address window 2206 and an address window 2207 are set equal.

The non-transparent bridge 2209 generates a packet 2302 (TLP4) having translated a transmission destination address of the packet 2301 (TLP3) entered to the non-transparent bridge 2209 from Address1 to Address2. The packet 2302 (TLP4) is entered to the switch 2304. The switch 2304 sends the packet 2302 (TLP4) according to the transmission destination address to the address window 2207 of the non-transparent bridge 2209.

The non-transparent bridge 2209 generates a packet 2303 (TLP5) in which the transmission destination address of packet 2302 (TLP4) entered to the non-transparent bridge 2209 is translated from Address3 to Address4. As described, it is possible to realize redirection of the packet via the non-transparent bridge 2209 and the switch 2304.

Further, the non-transparent bridge 2209 is equipped with address windows 2205 through 2208 used for packet redirection, and other address windows 2307 and 2308. The transmission destination address (Address5) of the packet entered through the address window 2307 is first translated to the address (Address6) within the address window 2308 and then transferred to a port and the like other than the port 2306 of the switch 2304.

In the PCI address space 2201, the path through which the packet is transmitted can be selected by the requester such as the processor sending the packet to either the address window 2205 or the address window 2307. When the processor sends a packet to the address window 2205, the packet is redirected and output from the address window 2208. On the other hand, when the processor sends a packet to the address window 2307, the packet is output from a port other than the port 2306 of the switch 2304.

In FIG. 25, the non-transparent bridge 2209 and the switch 2304 are illustrated as different components. As shown in switches 116 (SW1) and 126 (SW1) of FIG. 26, if the switch has a built-in non-transparent bridge, the transparent bridge and the non-transparent bridge within the switch are coupled via an internal bus within the switch.

Figure 26:
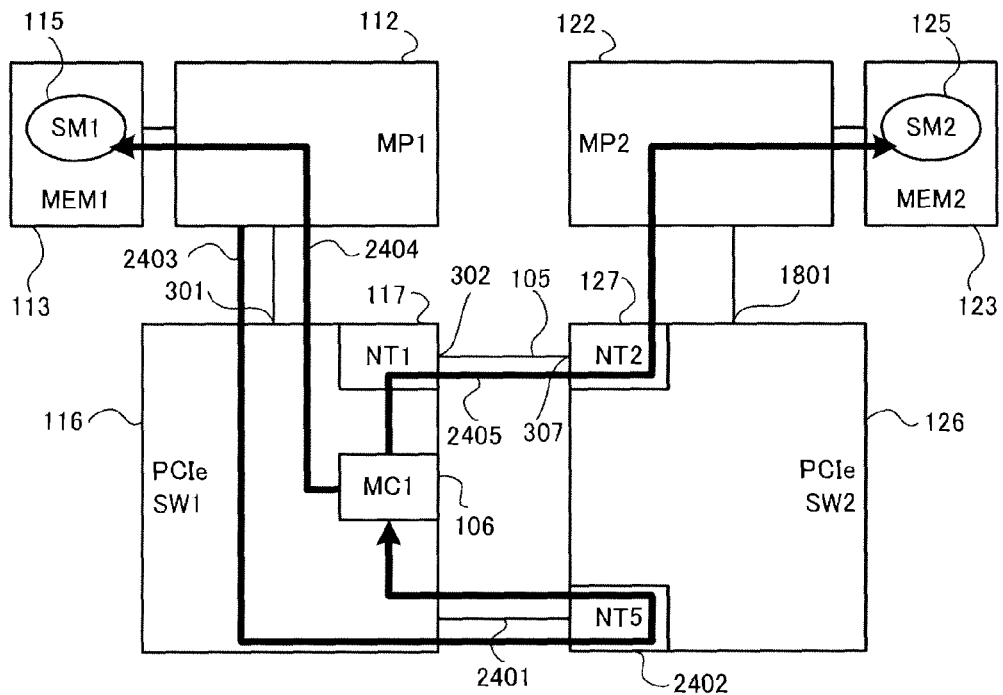
FIG. 26 is a view showing a data transfer path for writing data from the processors to the shared memories in a storage subsystem according to embodiment 4.

In FIG. 26, the switch 126 (SW2) comprises a non-transparent bridge 2402 (NT5). The switch 116 (SW1) and the non-transparent bridge 2402 (NT5) are coupled via a link 2401. Here, the non-transparent bridge 2402 (NT5) and the switch 126 (SW2) correspond to the non-transparent bridge 2209 and the switch 2304 of FIG. 25, respectively, and have similar settings. Therefore, the non-transparent bridge 2402 (NT5) functions as a packet redirector. In other words, the non-transparent bridge 2402 (NT5) in FIG. 26 corresponds to the packet redirector 107 (Redirector1) of FIG. 3.

FIG. 26 illustrates a data transfer path used for writing data from the processor 112 (MP1) into the shared memories 115 (SM1) and 125 (SM2). In writing data into the shared memories, the processor 112 (MP1) sends a packet storing the write data to the non-transparent bridge 2402 (NT5) (reference number 2403). The non-transparent bridge 2402 (NT5) sends the received packet to the multicast function 106 (MC1). Thereafter, the multicast function 106 (MC1) sends the received packet to the shared memories 115 (SM1) and 125 (SM2) (reference numbers 2404 and 2405).

Figure 27:
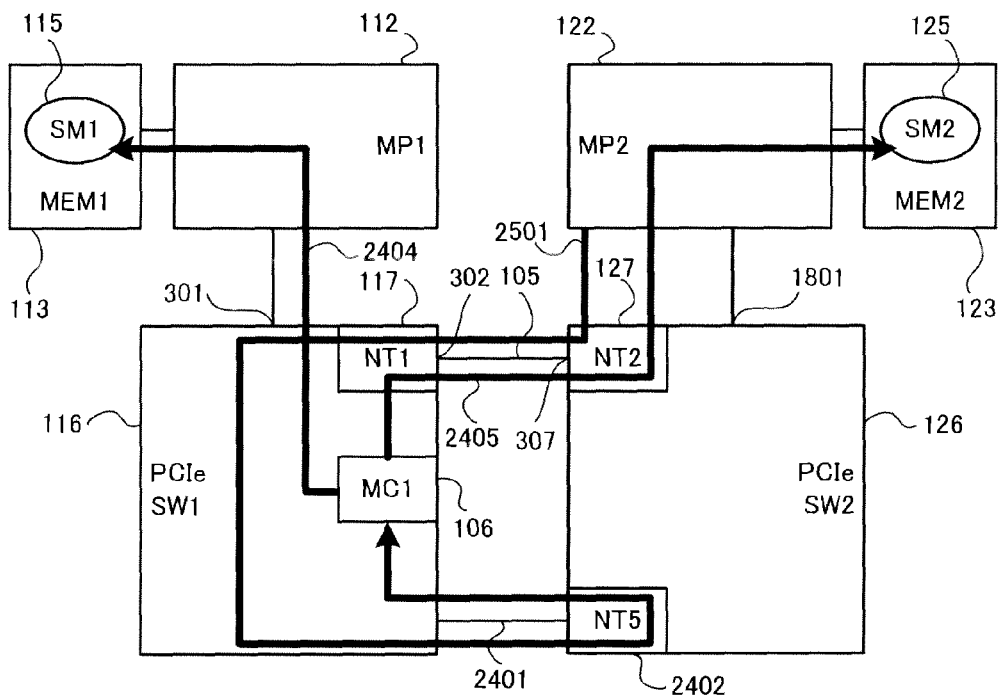
FIG. 27 is a view showing a data transfer path for writing data from the processors to the shared memories in the storage subsystem according to embodiment 4.

FIG. 27 shows a data transfer path used for writing data from the processor 122 (MP2) to the shared memories 115 (SM1) and 125 (SM2). Upon writing data to the shared memories, the processor 122 (MP2) sends the packet storing the write data via the NT link 105 to the non-transparent bridge 2402 (NT5) (reference number 2501). The non-transparent bridge 2402 (NT5) sends the received packet to the multicast function 106 (MC1). Thereafter, the multicast function 106 (MC1) sends the received packet to the shared memories 115 (SM1) and 125 (SM2) (reference numbers 2404 and 2405).

As described, according to embodiment 4, a packet redirector can be realized by combining a non-transparent bridge and a switch. As a result, similar to embodiment 1, the contents of shared memories 115 (SM1) and 125 (SM2) can be made consistent including the write order.

Embodiment 5

FIGS. 28 through 32 are views showing a data transfer path for writing data from a processor to shared memories according to the storage subsystem of embodiment 5. Now, the storage subsystem according to embodiment 5 will be described with reference to FIGS. 28 through 32.

Figure 28:
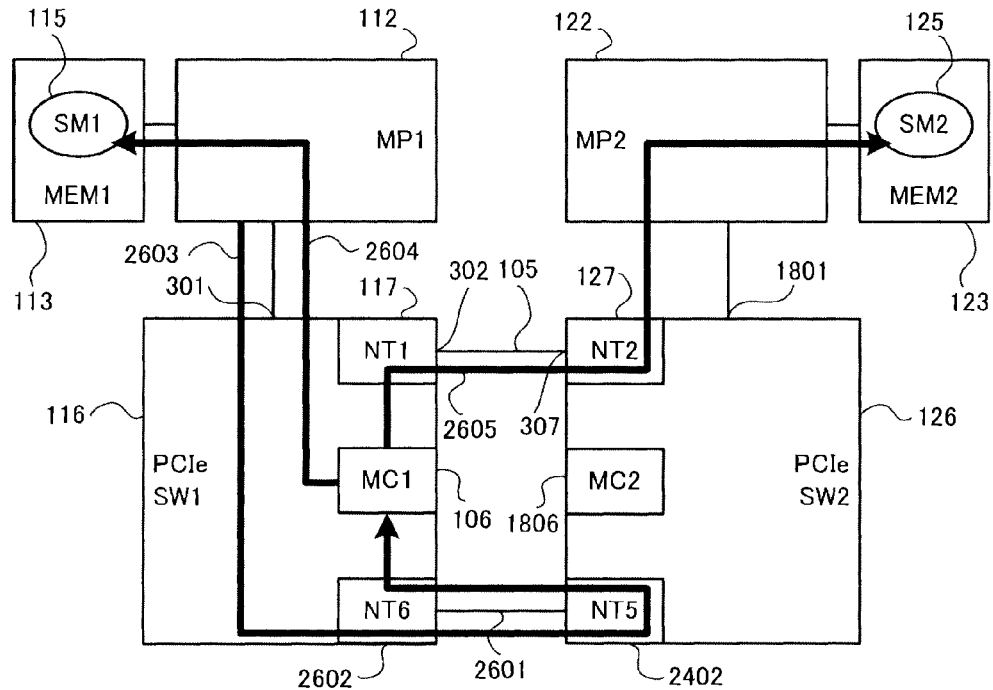
FIG. 28 is a view showing a data transfer path for writing data from the processors to the shared memories in a storage subsystem according to embodiment 5.

In FIG. 28, the switch 116 (SW1) comprises a non-transparent bridge 2602 (NT6), and the switch 126 (SW2) comprises a non-transparent bridge 2402 (NT5). The non-transparent bridge 2402 (NT5) and the non-transparent bridge 2602 (NT6) are coupled via an NT link 2601. Here, the non-transparent bridge 2402 (NT5) and the switch 126 (SW2) respectively correspond to the non-transparent bridge 2209 and the switch 2304 of FIG. 25, and have similar settings. Therefore, the non-transparent bridge 2402 (NT5) functions as a packet redirector.

Similarly, the non-transparent bridge 2602 (NT6) and the switch 116 (SW1) each correspond to the non-transparent bridge 2209 and the switch 2304 of FIG. 25, and have similar settings. Therefore, the non-transparent bridge 2602 (NT6) functions as a packet redirector.

In other words, the non-transparent bridge 2402 (NT5) of FIG. 28 corresponds to the packet redirector 107 (Redirector1) of FIG. 21, and the non-transparent bridge 2602 (NT6) of FIG. 28 corresponds to the packet redirector 1807 (Redirector2) of FIG. 21. Further, the link coupling the switch 116 (SW1) and the packet redirector 107 (Redirector1) and the link coupling the switch 126 (SW2) and the packet redirector 1807 (Redirector2) correspond to the same NT link 2601.

FIG. 28 shows a data transfer path used for writing data from the processor 112 (MP1) to the shared memories 115 (SM1) and 125 (SM2). Upon writing data to the shared memories, the processor 112 (MP1) sends the packet storing the write data to the non-transparent bridge 2402 (NT5) (reference number 2603). The non-transparent bridge 2402 (NT5) sends the received packet to the multicast function 106 (MC1). Then, the multicast function 106 (MC1) sends the received packet to the shared memories 115 (SM1) and 125 (SM2) (reference numbers 2604 and 2605).

Figure 29:
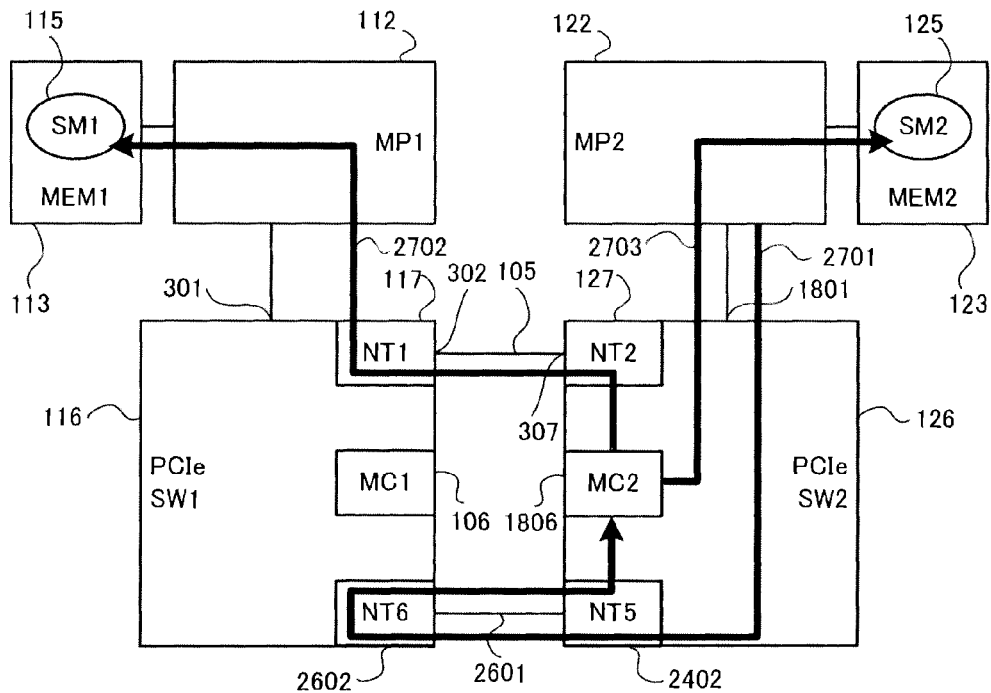
FIG. 29 is a view showing the data transfer path for writing data from the processors to the shared memories in the storage subsystem according to embodiment 5.

FIG. 29 shows a data transfer path used for writing data from the processor 122 (MP2) to the shared memories 115 (SM1) and 125 (SM2). Upon writing data to the shared memories, the processor 122 (MP2) sends the packet storing the write data to the non-transparent bridge 2602 (NT6) (reference number 2701). The non-transparent bridge 2602 (NT6) sends the received packet to the multicast function 1806 (MC2). Then, the multicast function 1806 (MC2) sends the received packet to the shared memories 115 (SM1) and 125 (SM2) (reference numbers 2702 and 2703).

Figure 30:
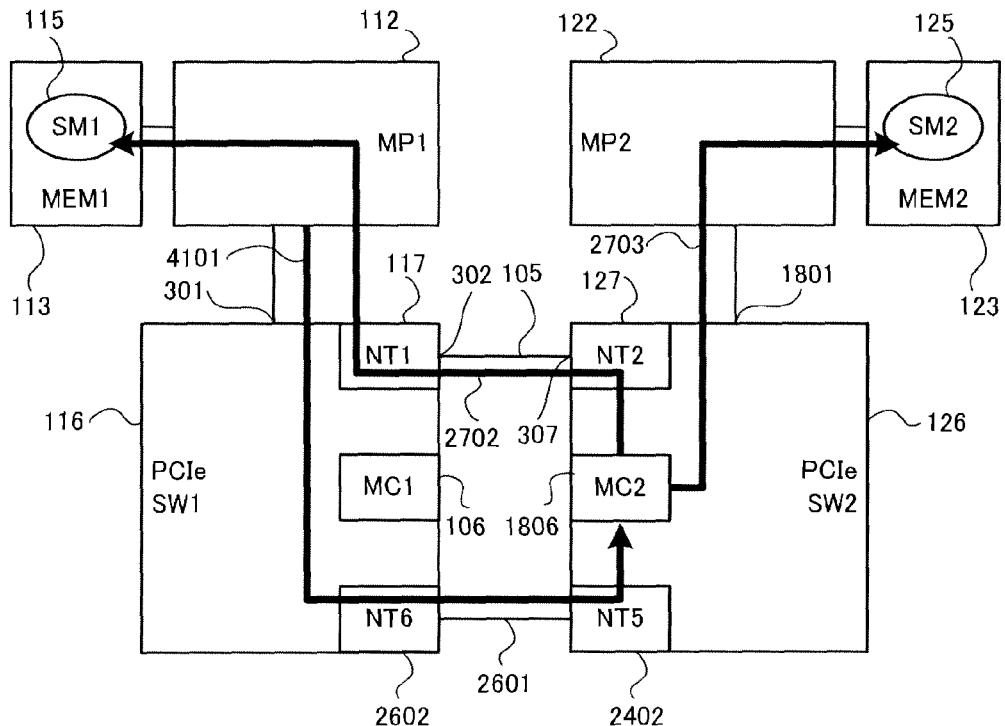
FIG. 30 is a view showing the data transfer path for writing data from the processors to the shared memories in the storage subsystem according to embodiment 5.

FIG. 30 shows a data transfer path that the processor 112 (MP1) uses to write data into the shared memories utilizing the multicast function 1806 (MC2) of the switch 126 (SW2). In this example, the packet storing the data to be written into the shared memories must be passed through non-transparent bridges 2402 (NT5) and 2602 (NT6) without being redirected. Therefore, the non-transparent bridges 2402 (NT5) and 2602 (NT6) are equipped with a plurality of address windows, similar to the non-transparent bridge 2209 of FIG. 25. The processor 112 (MP1) selects an address window of the transmission destination by determining which multicast function of the two switches should be used (whether to redirect the transmitted packet or not).

Upon writing data into the shared memories, the processor 112 (MP1) sends the packet storing the write data to the address window not performing redirection of the non-transparent bridge 2402 (NT5) (reference number 4101). The non-transparent bridge 2402 (NT5) sends the received packet to the multicast function 1806 (MC2). Then, the multicast function 1806 (MC2) sends the received packet to the shared memories 115 (SM1) and 125 (SM2) (reference numbers 2702 and 2703).

Figure 31:
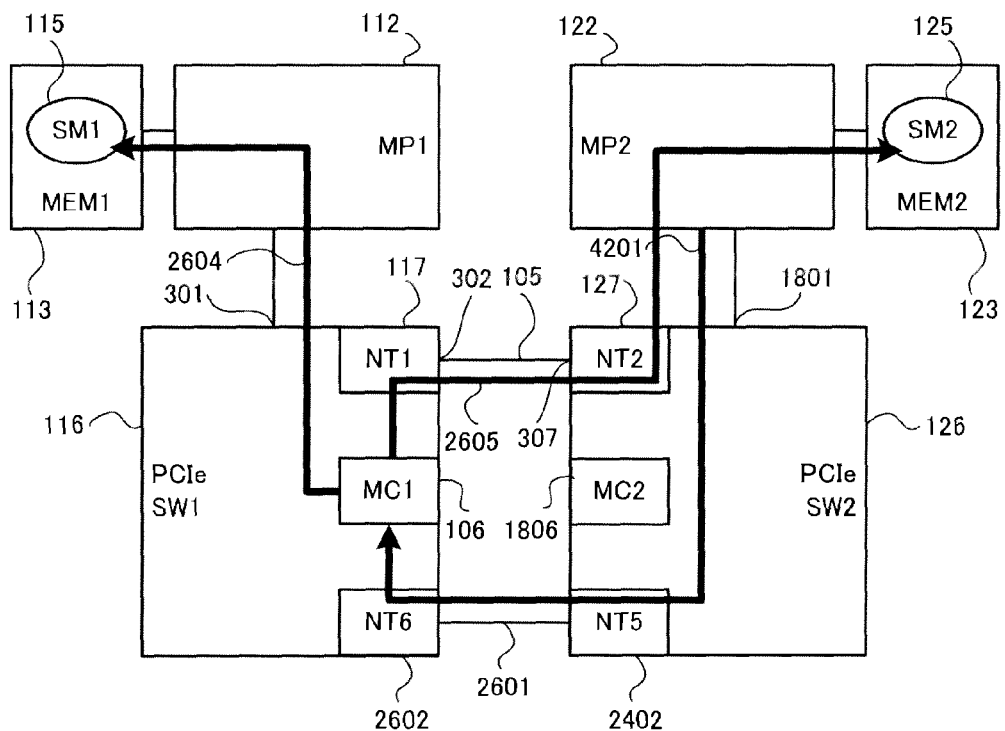
FIG. 31 is a view showing the data transfer path for writing data from the processors to the shared memories in the storage subsystem according to embodiment 5.

FIG. 31 shows a data transfer path that the processor 122 (MP2) uses to write data into the shared memories utilizing the multicast function 106 (MC1) of the switch 116 (SW1). Upon writing data into the shared memories, the packet storing the write data is sent to the address window not performing redirection of the non-transparent bridge 2602 (NT6) (reference number 4201). The non-transparent bridge 2602 (NT6) sends the received packet to the multicast function 106 (MC1). Then, the multicast function 106 (MC1) sends the received packet to the shared memories 115 (SM1) and 125 (SM2) (reference numbers 2604 and 2605).

Figure 32:
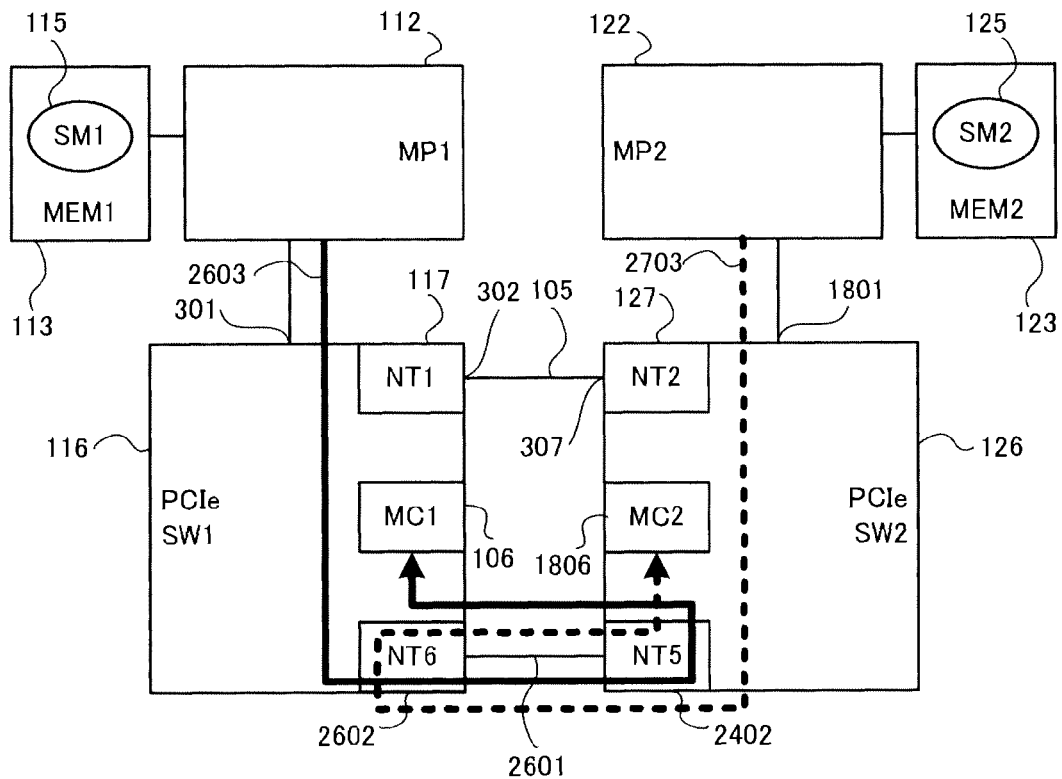
FIG. 32 is a view showing a configuration example of a storage subsystem according to embodiment 5.

FIG. 32 shows an example in which a packet transmission from the processor 112 (MP1) to the multicast function 106 (MC1) and a packet transmission from the processor 122

(MP2) to the multicast function 1806 (MC2) occur simultaneously in the storage subsystem of embodiment 5. If a loop is formed when two packet transmission paths (reference numbers 2603 and 2703) are combined, a deadlock may occur in the NT link 2601. In order to prevent deadlock, the NT link 2601 is equipped with two virtual channels (VC0 and VC1).

When transmitting a packet from the non-transparent bridge 2602 (NT6) to the non-transparent bridge 2402 (NT5), a virtual channel VC0 in the NT link 2601 is used to transfer the packet. When transmitting a packet from the non-transparent bridge 2402 (NT5) to the non-transparent bridge 2602 (NT6), a virtual channel VC1 in the NT link 2601 is used to transfer the packet. Thereby, the two-direction packet data transmission is performed in a logically independent manner, so that deadlock can be prevented.

Embodiment 6

Now, a storage subsystem according to embodiment 6 of the present invention will be described with reference to FIGS. 33 through 38.

Figure 33:
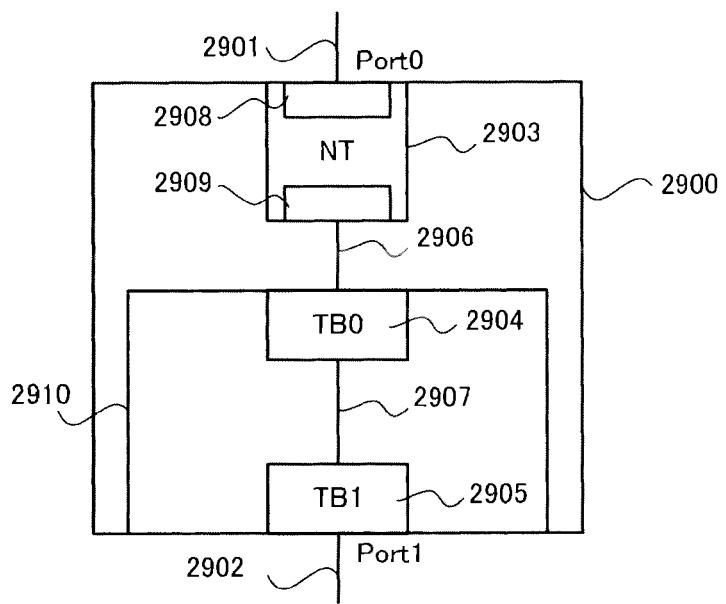
FIG. 33 is a view showing a configuration example of a packet redirector according to embodiment 6.

FIG. 33 illustrates a configuration example of a packet redirector. The packet redirector 2900 is composed of a non-transparent bridge 2903 and a switch 2910. Further, the packet redirector 2900 is equipped with two upstream ports 2901 and 2902.

The non-transparent bridge 2903 has Endpoints 2908 and 2909 disposed in the interior thereof. The switch 2910 has transparent bridges 2904 and 2905 disposed in the interior thereof. The transparent bridges 2904 and 2905 are coupled via an internal bus 2907. The Endpoint 2909 and the transparent bridge 2904 are coupled via an internal bus 2906.

The operation of the packet redirector 2900 is similar to the operation of the packet redirector combining the non-transparent bridge 2209 and the switch 2304 described with reference to FIG. 25. That is, the packet entering through an upstream port 2901 to the redirecting address window of the Endpoint 2908 is redirected through the switch 2910 and output through the upstream port 2901. Further, the packet entering through the upstream port 2901 to the non-redirecting address window of the Endpoint 2908 is not redirected and output through the upstream port 2902.

Figure 34:
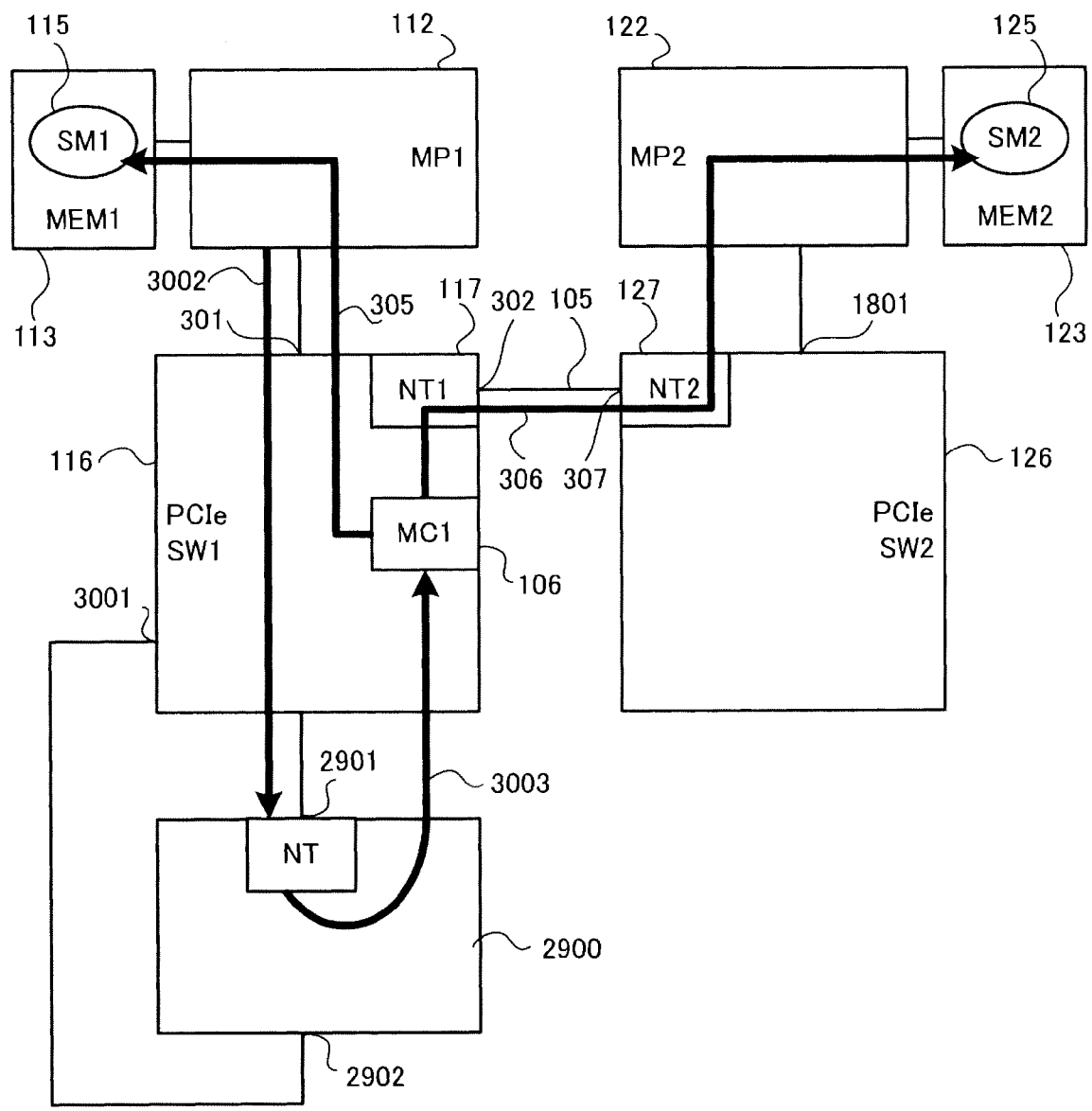
FIG. 34 is a view showing a data transfer path for writing data from the processors to the shared memories in the storage subsystem according to embodiment 6.

FIG. 34 shows a configuration example of a storage subsystem in which the packet redirector 107 (Redirector1) of FIG. 3 is replaced with a packet redirector 2900. An upstream port 2902 of the packet redirector 2900 is coupled to a port 3001 of the switch 116 (SW1). This coupling is used not only as a data transfer path but also for setting a switch 2910 and an Endpoint 2909 within the packet redirector 2900.

Further, FIG. 34 illustrates a data transfer path through which the processor 112 (MP1) writes data into the shared memories 115 (SM1) and 125 (SM2) using the packet redirector 2900 and the multicast function 106 (MC1). The processor 112 (MP1) sends a packet storing the write data to the shared memories to the redirecting address window of the Endpoint 2908 within the packet redirector 2900 (reference number 3002). The packet redirector 2900 sends the received packet to the multicast function 106 (MC1) (reference number 3003). The multicast function 106 (MC1) copies the received packet and sends the same to the shared memory 115 (SM1) and the shared memory 125 (SM2) (reference numbers 305 and 306).

The writing of data from the processor 122 (MP2) to the shared memories 115 (SM1) and 125 (SM2) using the packet redirector 2900 and the multicast function 106 (MC1) is the same as FIG. 4.

Figure 35:
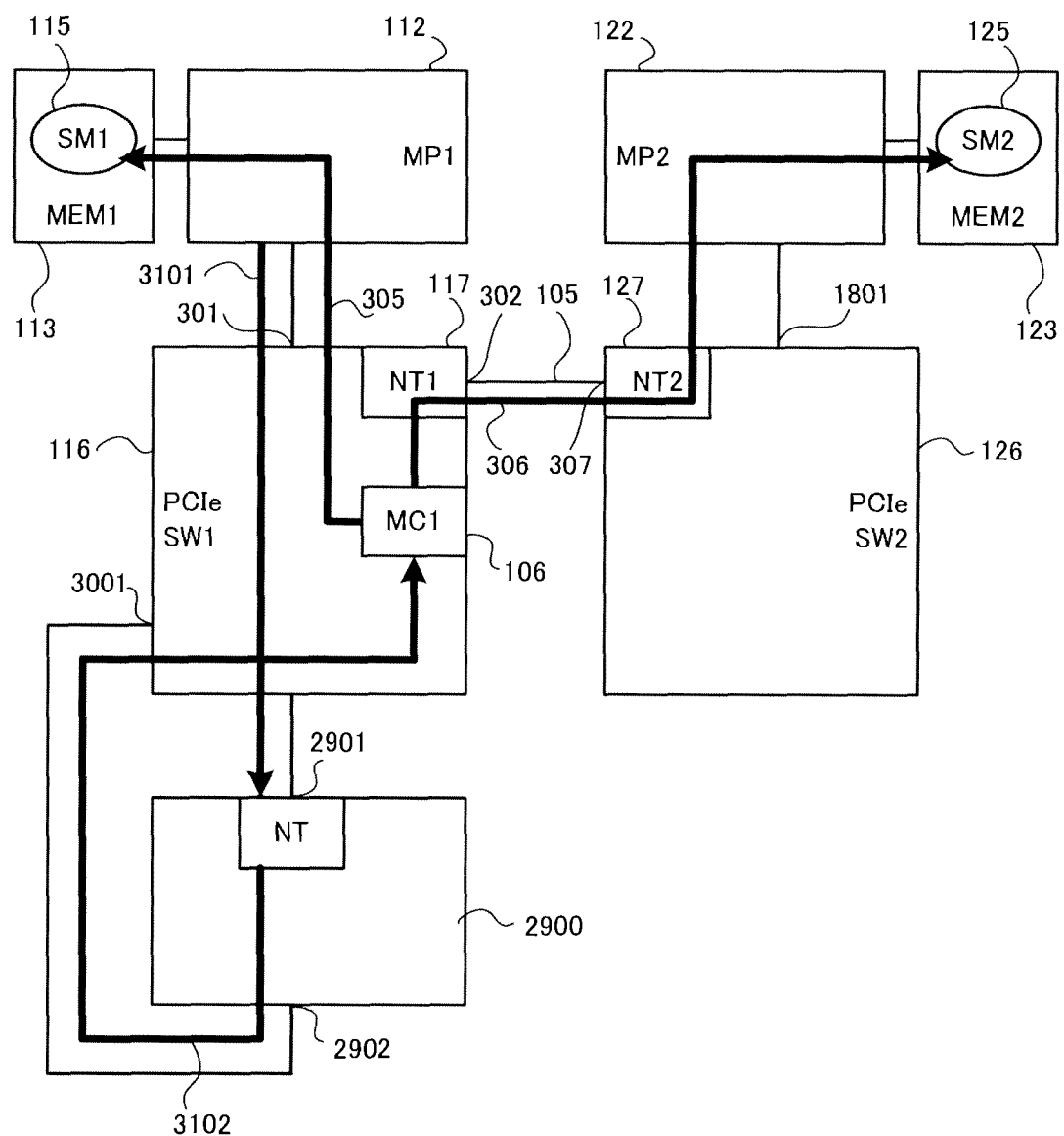
FIG. 35 is a view showing a data transfer path for writing data from the processors to the shared memories in the storage subsystem according to embodiment 6.

FIG. 35 illustrates another example of a data transfer path through which the processor 112 (MP1) writes data into the shared memories 115 (SM1) and 125 (SM2) using the packet redirector 2900 and the multicast function 106 (MC1). The processor 112 (MP1) sends the packet storing the data to be written into the shared memories to a non-redirecting address window of the Endpoint 2908 within the packet redirector 2900 (reference number 3101).

The packet redirector 2900 sends the received packet via a port 3001 of the switch 116 (SW1) to the multicast function 106 (MC1) (reference number 3102). The multicast function 106 (MC1) copies the received packet and sends the packets to the shared memory 115 (SM1) and the shared memory 125 (SM2) (reference numbers 305 and 306).

Figure 36:
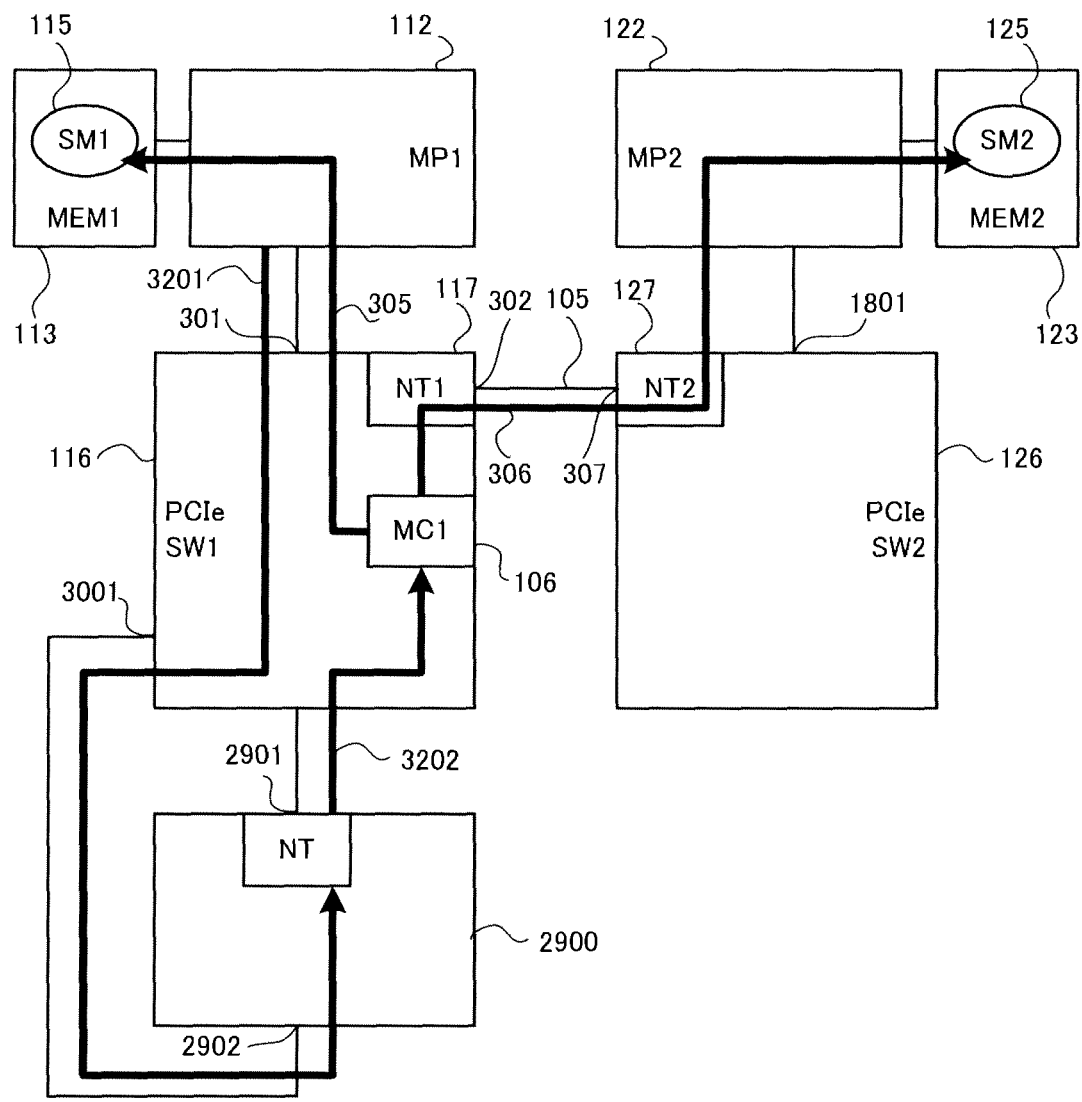
FIG. 36 is a view showing a data transfer path for writing data from the processors to the shared memories in the storage subsystem according to embodiment 6.

FIG. 36 illustrates yet another example of a data transfer path through which the processor 112 (MP1) writes data into the shared memories 115 (SM1) and 125 (SM2) using the packet redirector 2900 and the multicast function 106 (MC1). The packet redirector 2900 translates the transmission destination address of a packet entered through the upstream port 2902 to a multicast address of the multicast function 106 (MC1) of the switch 116 (SW1). The processor 112 (MP1) sends the packet storing the write data to the shared memories to the upstream port 2902 of the packet redirector 2900 via the port 3001 of the switch 116 (SW1) (reference number 3201).

The packet redirector 2900 sends the received packet to the multicast function 106 (MC1) via the upstream port 2901 of the packet redirector 2900 (reference number 3202). The multicast function 106 (MC1) copies the received packet and sends the same to the shared memory 115 (SM1) and the shared memory 125 (SM2) (reference numbers 305 and 306).

Figure 37:
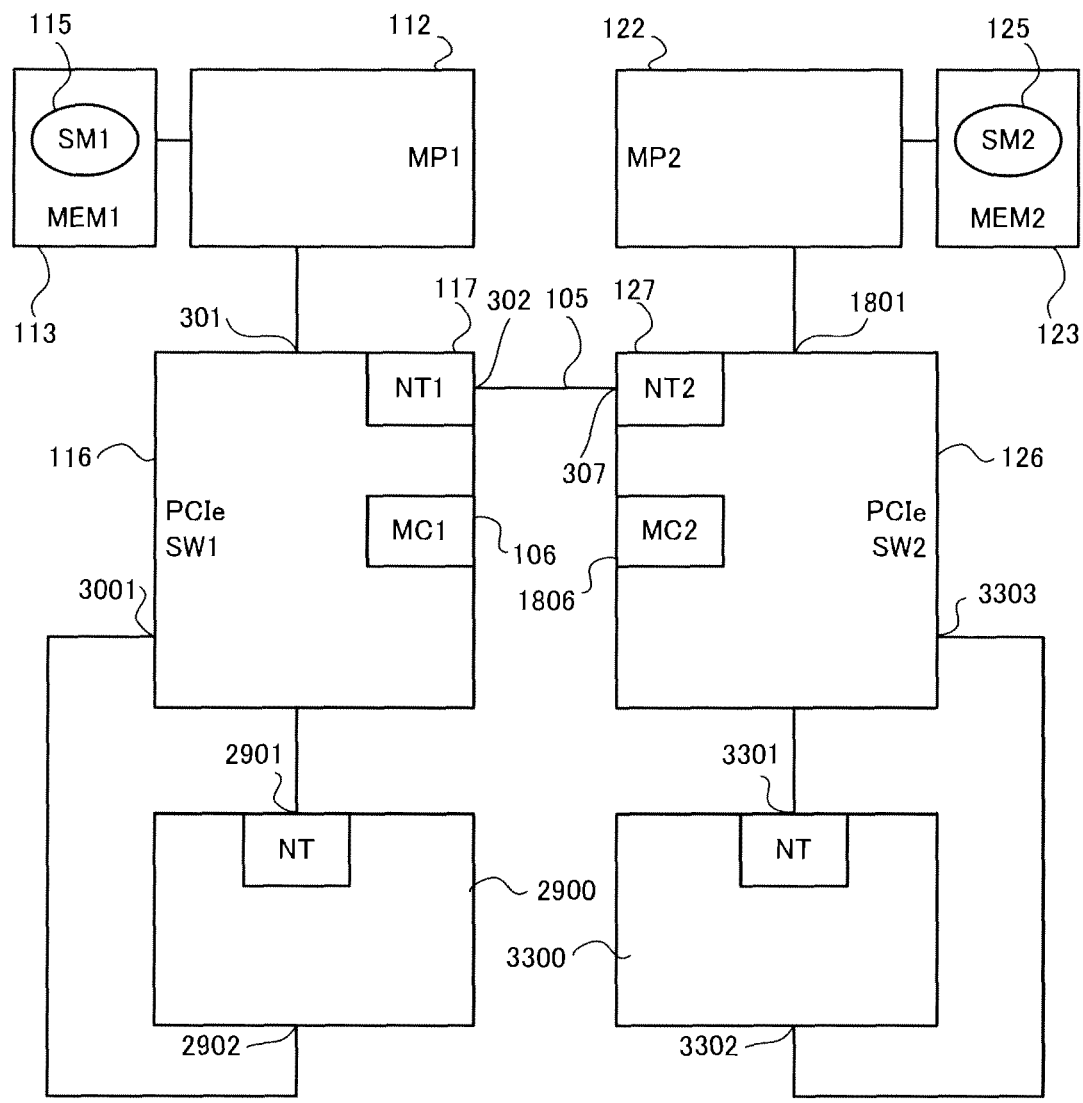
FIG. 37 is a view showing a configuration example of the storage subsystem according to embodiment 6.

FIG. 37 shows an example of a storage system configuration in which a packet redirector 3300 having the same functions as the packet redirector 2900 of the configuration of FIGS. 34 through 36 is coupled to the switch 126 (SW2). The storage subsystem according to the configuration of FIG. 37 is similar to the storage system described in FIG. 18 illustrating embodiment 2, wherein the load of the data writing process to shared memories can be shared between two multicast functions 106 (MC1) and 1806 (MC2).

Figure 38:
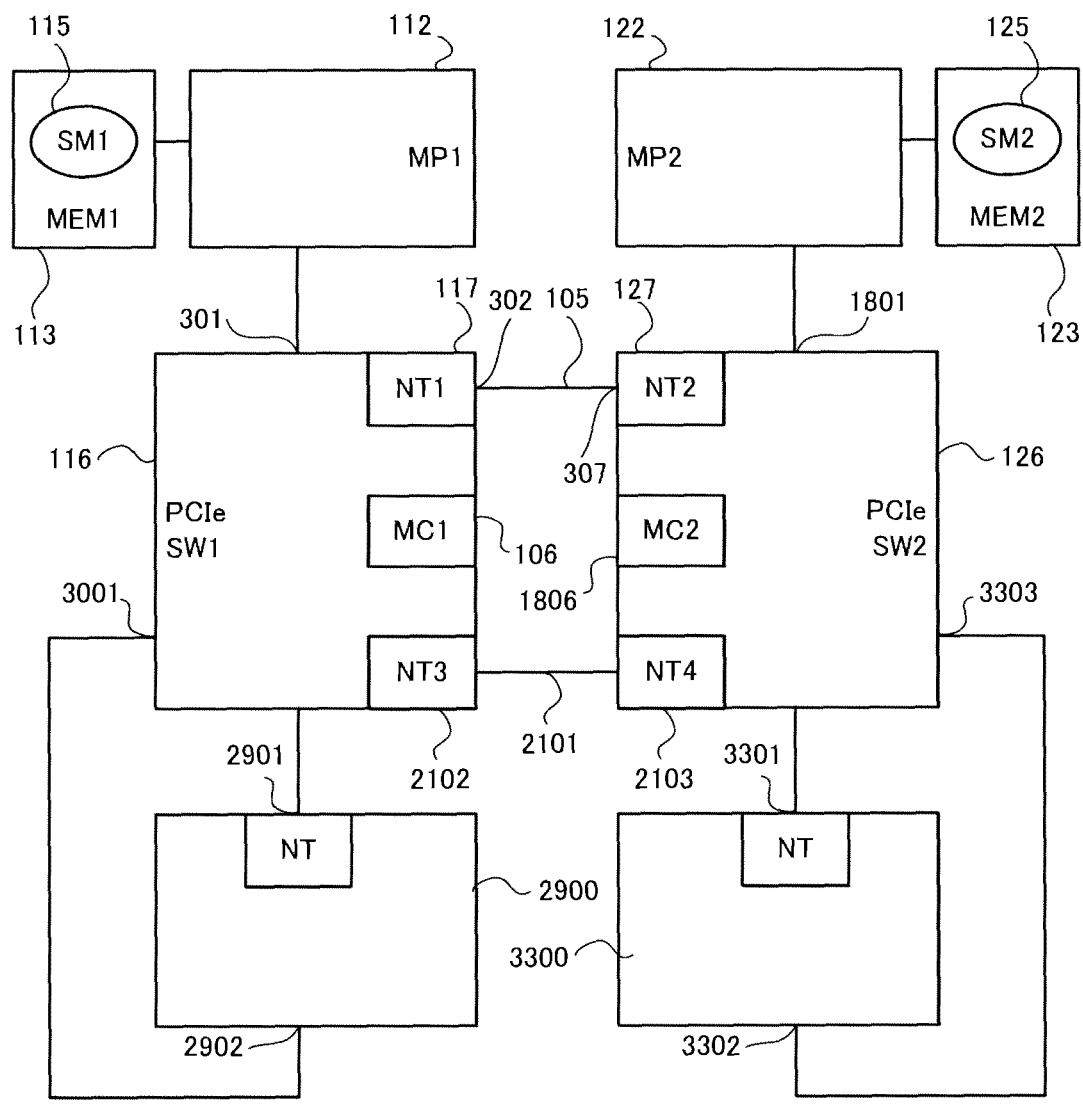
FIG. 38 is a view showing a configuration example of the storage subsystem according to embodiment 6.

FIG. 38 shows a configuration example of a storage subsystem in which, with respect to the configuration of FIG. 37, the switch 116 (SW1) is equipped with a non-transparent bridge 2102 (NT3), the switch 126 (SW2) is equipped with a non-transparent bridge 2103 (NT4), and the non-transparent bridge 2102 (NT3) and the non-transparent bridge 2103 (NT4) are coupled via an NT link 2101.

Similar to the storage subsystem described in FIG. 23 of embodiment 3, the storage subsystem having the configuration of FIG. 38 utilizes the NT link 105 exclusively for transmitting a data packet storing write data (control information) to the shared memories. Further, it utilizes the NT link 2101 exclusively for transmitting a data packet storing user data to be written into the cache memories. Thus, it will not be necessary to wait for the completion of data transfer of user data to the cache memories before transferring the control information, and the write time of data into the shared memories can be reduced.

Embodiment 7

Figure 39:
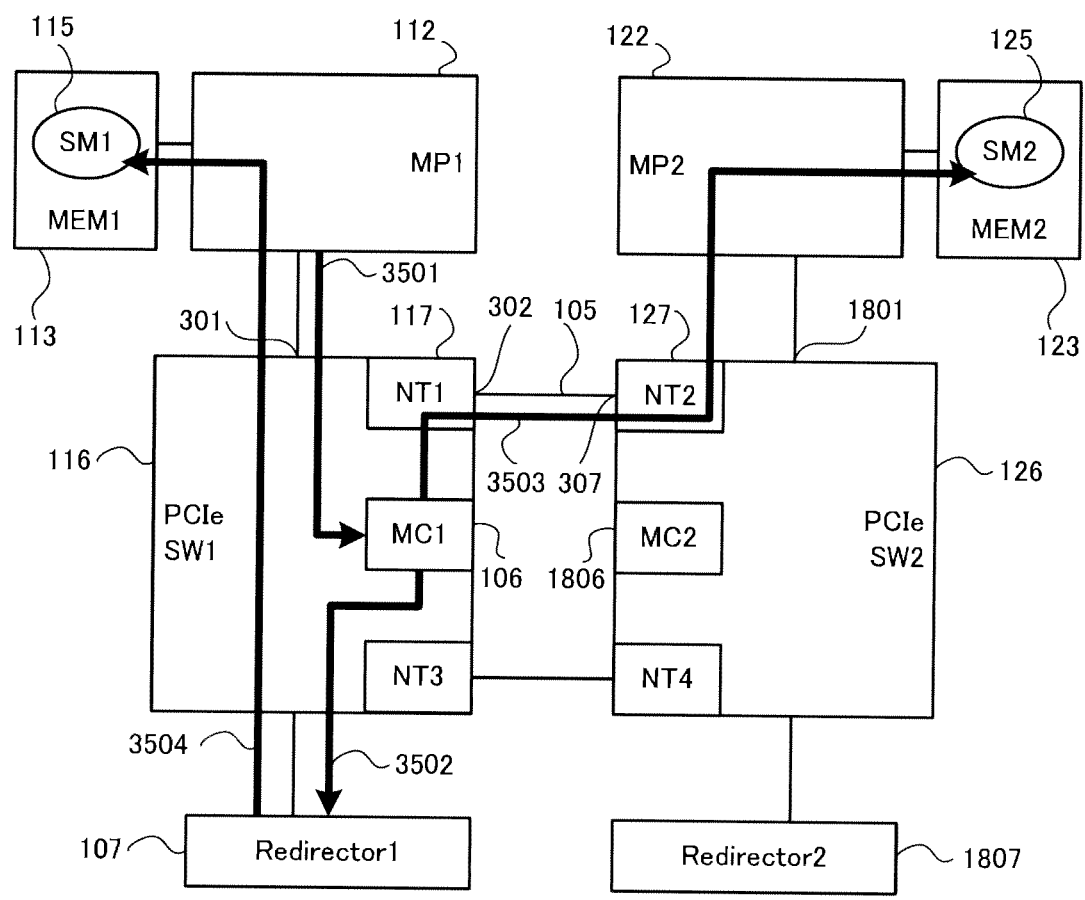
FIG. 39 is a view showing a data transfer path for writing data from the processors to the shared memories in the storage subsystem according to embodiment 7.

Now, with reference to FIGS. 39 and 40, a storage subsystem according to embodiment 7 will be described. According to embodiment 7, the order of the packet storing write data to the shared memories passing the multicast function and the packet redirector differs from that of the other embodiments. FIG. 39 shows a data transfer path through which the processor 112 (MP1) writes data into the shared memories using the multicast function 106 (MC1) of the switch 116 (SW1) and the packet redirector 107 (Redirector1) coupled to the switch 116 (SW1).

Upon writing data into the shared memories, the processor 112 (MP1) sends the packet storing the write data to the multicast group address of the multicast function 106 (MC1) (reference number 3501). The switch 116 (SW1) has the packet redirector 107 (Redirector1) and the non-transparent bridge 117 (NT1) set within the same multicast group. The multicast function 106 (MC1) copies the received packet, wherein one packet is transmitted to the packet redirector 107 (Redirector1) (reference number 3502) and the other packet is transmitted via the NT link 105 to the shared memory 125 (SM2) (reference number 3503). The packet redirector 107 (Redirector1) sends the received packet to the shared memory 115 (SM1) (reference number 3504).

The data transfer path through which the processor 122 (MP2) uses the multicast function 1806 (MC2) to write data into the shared memories is similar to FIG. 39, although it is not shown. That is, upon writing data to the shared memories the processor 122 (MP2) sends the packet storing the write data to the multicast group address of the multicast function 1806 (MC2). The switch 126 (SW2) has the packet redirector 1807 (Redirector2) and the non-transparent bridge 127 (NT2) set within the same multicast group. The multicast function 1806 (MC2) copies the received packet, wherein one packet is transmitted to the packet redirector 1807 (Redirector2) and the other packet is transmitted via the NT link 105 to the shared memory 115 (SM1). The packet redirector 1807 (Redirector2) sends the received packet to the shared memory 125 (SM2).

Figure 40:
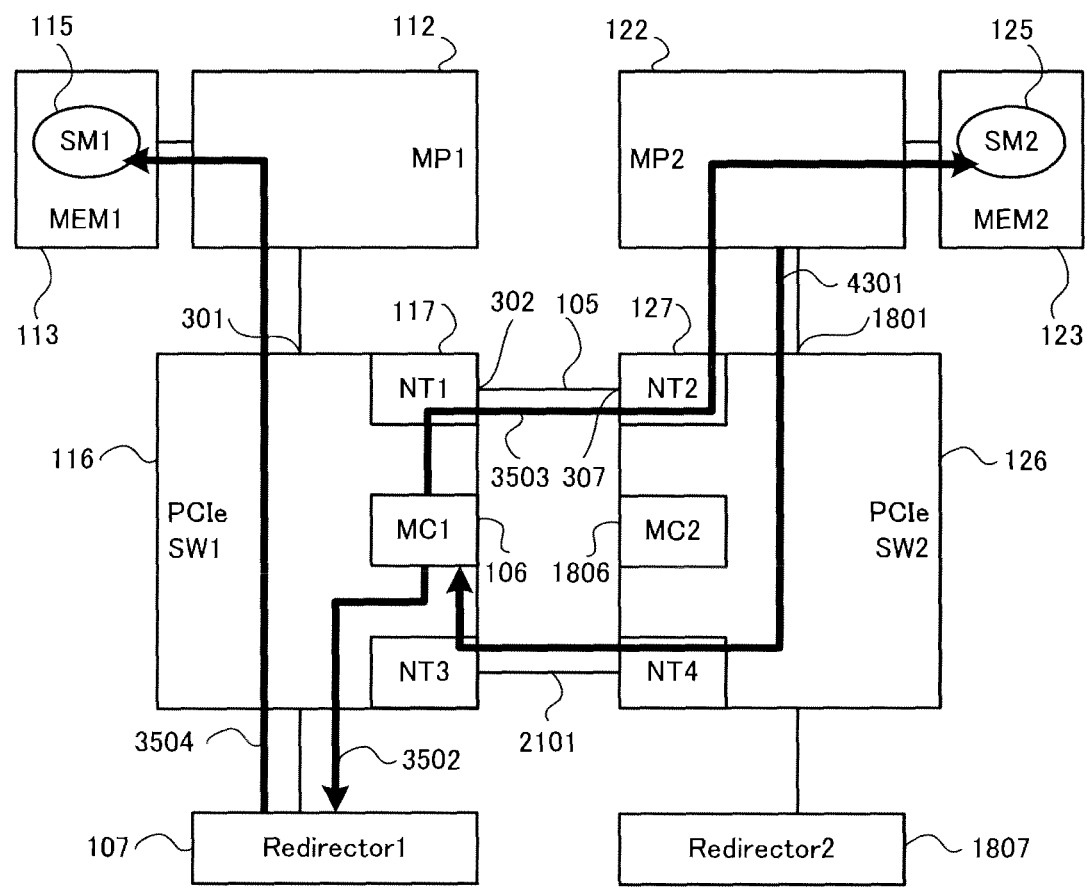
FIG. 40 is a view showing a data transfer path for writing data from the processors to the shared memories in the storage subsystem according to embodiment 7.

FIG. 40 shows a data transfer path through which the processor 122 (MP2) writes data into shared memories using a multicast function 106 (MC1) of the switch 116 (SW1) and a packet redirector 107 (Redirector1) coupled to the switch 116 (SW1). Upon writing data to the shared memories, the processor 122 (MP2) sends the packet storing the write data via an NT link 2101 to the multicast group address of the multicast function 106 (MC1) (reference number 4301). The multicast function 106 (MC1) copies the received packet, and sends one packet to the packet redirector 107 (Redirector1) (reference 3502) and the other packet via the NT link 105 to the shared memory 125 (SM2) (reference number 3503). The packet redirector 107 (Redirector1) sends the received packet to the shared memory 115 (SM1) (reference number 3504).

The data transfer path through which the processor 112 (MP1) writes data into the shared memories via the multicast function 1806 (MC2) is not shown, but it can be transferred via a similar operation as FIG. 40. That is, upon writing data to the shared memories, the processor 112 (MP1) sends the packet storing the write data via the NT link 2101 to the multicast group address of the multicast function 1806 (MC2). The multicast function 1806 (MC2) copies the received packet, and sends one packet to the packet redirector 1807 (Redirector 2) and the other packet via the NT link 105 to the shared memory 115 (SM1). The packet redirector 1807 (Redirector2) sends the received packet to the shared memory 125 (SM2). As described, even by sending the packet first through the multicast function and then through the packet redirector, it is possible to write data into two shared memories with corresponding orders.

Embodiment 8

Figure 41:
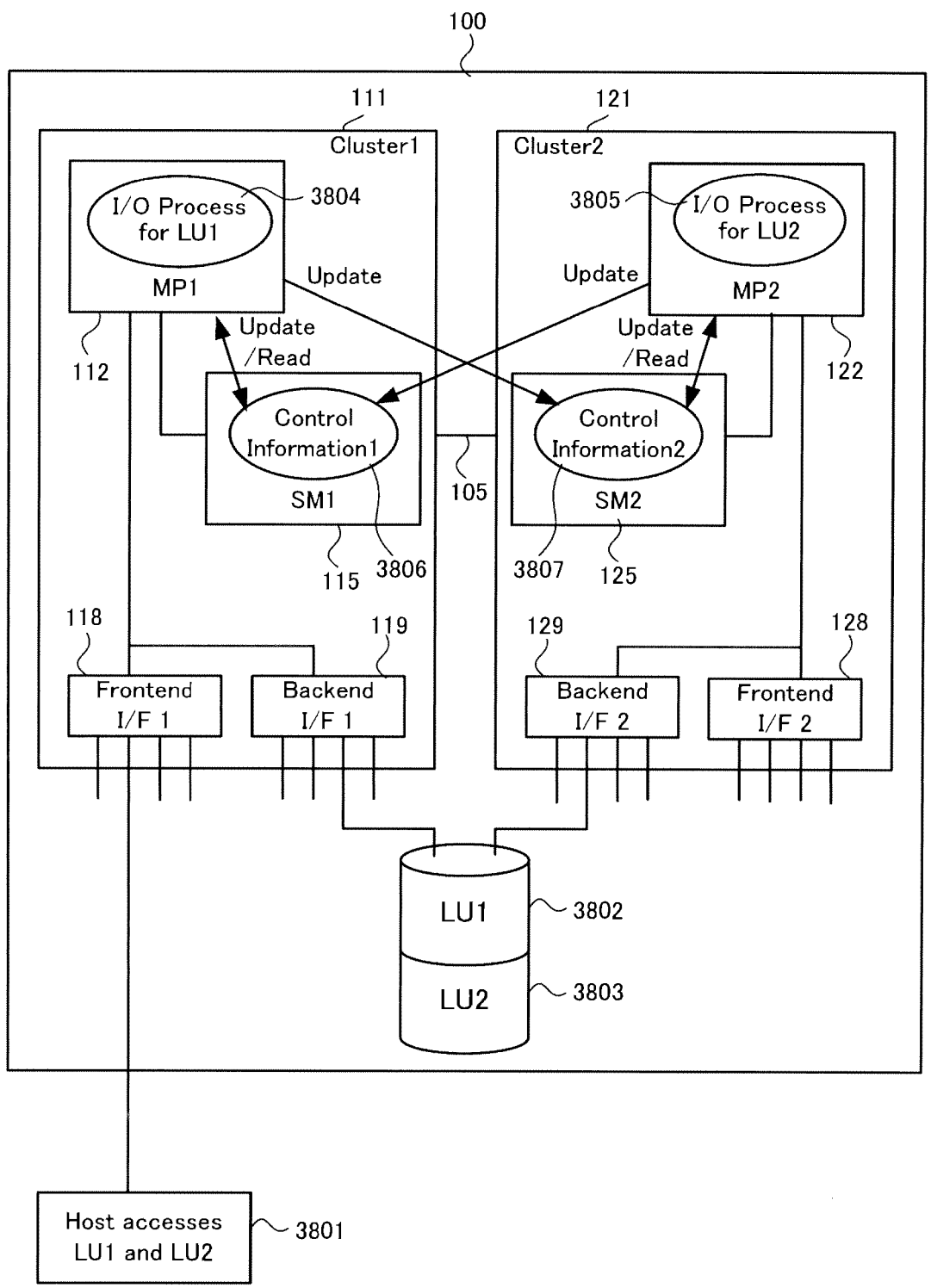
FIG. 41 is a view showing an application example of the storage subsystem according to embodiment 8.

Now, the storage subsystem according to embodiment 8 of the present invention will be described with reference to FIGS. 41 through 43. FIG. 41 shows one example of a cooperative operation of two clusters 111 (Cluster1) and 121 (Cluster2). The host system 3801 accesses two logical volumes 3802 (LU1) and 3803 (LU2) within the storage subsystem 100. The storage subsystem 100 performs load balancing regarding the I/O processing among two clusters. For example, the I/O processing regarding the logical volume 3802 (LU1) is performed by the processor 112 (MP1) within the cluster 111 (Cluster1) (reference number 3804), and the I/O processing regarding the logical volume 3803 (LU2) is performed by the processor 122 (MP2) within the cluster 121 (Cluster2) (reference number 3805).

The processor 112 (MP1) refers to the control information 3806 within the shared memory 115 (SM1) accompanying the I/0 processing and updates the control information 3806 and 3807 within the shared memories 115 (SM1) and 125 (SM2). The processor 122 (MP2) refers to the control information 3807 within the shared memory 125 (SM2) accompanying the I/O processing and updates the control information 3806 and 3807 within the shared memories 115 (SM1) and 125 (SM2).

Figure 42:
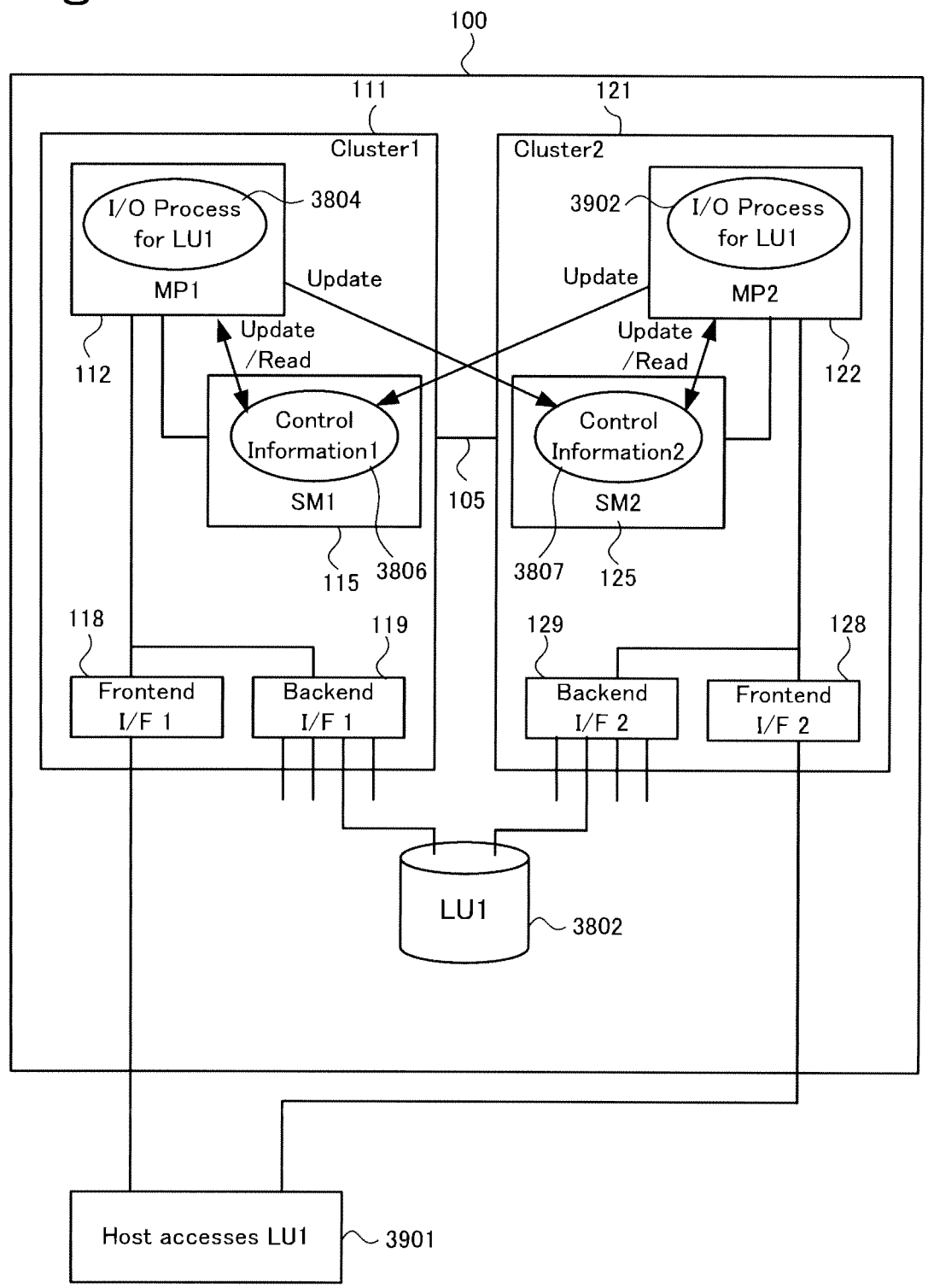
FIG. 42 is a view showing an application example of the storage subsystem according to embodiment 8.

FIG. 42 illustrates another example of the cooperative operation of two clusters 111 (Cluster1) and 121 (Cluster2). The host system 3901 accesses a logical volume 3802 (LU1) within the storage subsystem 100 via a frontend interface 118 (FEIF1) and a frontend interface 128 (FEIF2). Both clusters 111 (Cluster1) and cluster 121 (Cluster2) perform I/O processing (reference numbers 3804 and 3902) with respect to the logical volume 3802 (LU1).

Similar to the case of FIG. 41, the processor 112 (MP1) refers to the control information 3806 within the shared memory 115 (SM1) accompanying the I/O processing and updates the control information 3806 and 3807 within the shared memories 115 (SM1) and 125 (SM2). The processor 122 (MP2) refers to the control information 3807 within the shared memory 125 (SM2) accompanying the I/O processing and updates the control information 3806 and 3807 within the shared memories 115 (SM1) and 125 (SM2).

Figure 43:
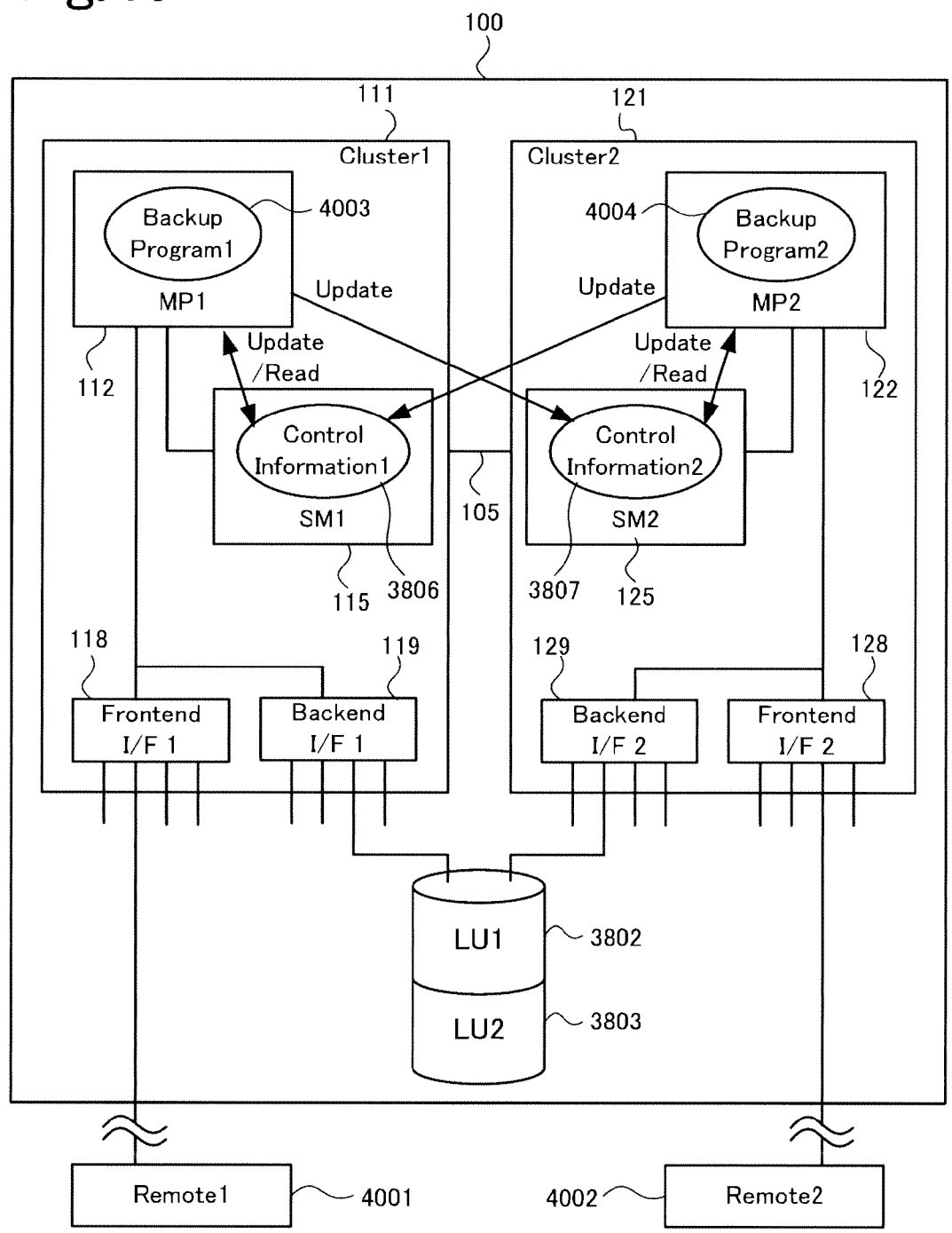
FIG. 43 is a view showing an application example of the storage subsystem according to embodiment 8.

FIG. 43 illustrates the respective backup operations of the two clusters. In cluster 111 (Cluster1), the processor 112 (MP1) executes a backup program 4003 and performs backup processing to a remote site 4001. Similarly, in cluster 121 (Cluster2), the processor 122 (MP2) executes a backup program 4004 and performs backup processing to a remote site 4002. The target of such backup processing include the control information stored in the shared memories 115 and 125 (SM1 and SM2).

According to the storage subsystem 100 of embodiment 8, two clusters are operated cooperatively as shown in FIGS. 41 and 42, frequently updating the control information within the shared memories. However, according to the effect of the present invention, the contents of the control information 3806 and 3807 are consistent even including the writing order of data. As a result, the backup data that clusters 111 (Cluster1) and 121 (Cluster2) create in remote sites 4001 and 4002, respectively, can be made consistent including the writing order of the control information.

As described, according to the storage subsystem of the present invention, the contents of the two shared memories stored in the main memories of the two processors can be made consistent including the writing order of data. Further, regarding the reading of data from the shared memories by the processor, each processor can directly access a nearby main memory to read the data in the shared memory, so that the access time can be reduced.

The present invention has been illustrated according to the preferred embodiments of the invention, but the present invention is not restricted to the above-illustrated embodiments, and various modifications are possible within the scope of the prevent invention.

INDUSTRIAL APPLICABILITY

The present invention can be applied widely not only to storage subsystems adopting a PCI Express in the internal network of storage controllers, but also to information processing devices and computer systems such as large-scale computers, general-purpose computers and servers having mirrored shared memories.

REFERENCE SIGNS LIST

100 Storage subsystem
101 Storage controller
102 Disk array
103, 104 Host system (Host)
106 Multicast function
107 Packet redirector (Redirector)
111, 121 Cluster
112, 122 Processor
113, 123 Main memory (MEM1, MEM2)
114, 124 Cache memory (CM1, CM2)
115, 125 Shared memory (SM1, SM2)
116, 126 Switch (PCI Express switch)
117, 127 Non-transparent bridge
118, 128 Frontend interface
119, 129 Backend interface
105 NT (Non Transparent) link
200 Switch
201 Upstream port
202, 203 Downstream port
204, 205, 206 Transparent bridge
207 Virtual PCI bus
208 PCI address space
209, 210, 211 Pass address range
212, 213, 214 Multicast address
301 Upstream port
302, 307 Port
600, 1001, 1900 Shared memory management table
601 Shared memory address
602 Unfinished write flag
603, 604 Unfinished write flag status
1801 Upstream port
1806 Multicast function
1807, 2900 Packet redirector
2101 NT link
2102, 2103, 2209, 2402, 2602, 2903 Non-transparent bridge
2904, 2905 Transparent bridge
2210, 2211 Endpoint
2201, 2202 PCI address space
2205, 2206, 2207, 2208, 2307, 2308 Address window
2203, 2204, 2301, 2302, 2303 Packet
2304, 2910 Switch
2306, 3001 Port
2401, 2601 Link
2901, 2902 Upstream port
2907 Internal bus
2908, 2909 Endpoint
3801, 3901 Host system
3802, 3803 Logical volume
3806, 3807 Control information
4001, 4002 Remote site
4003, 4004 Backup program

The invention claimed is:

1. A storage subsystem having a storage controller, the storage controller comprising:
a first processor;
a first memory coupled to the first processor;
a first switch coupled to the first processor and having a first multicast function and a first non-transparent bridge;
a second processor;
a second memory coupled to the second processor; and
a second switch coupled to the second processor and having a second non-transparent bridge;
wherein the first non-transparent bridge and the second non-transparent bridge are coupled via a first link;
cache memories storing user data and mirrored shared memories storing control information are formed within the first memory and the second memory;
the storage controller is further equipped with a first packet redirector coupled to the first switch;
the first switch has the first processor and the first non-transparent bridge set within a first multicast group;
the first packet redirector causes the received packet to be transferred in the received order to the first multicast group address; and
the first processor causes a packet to be transferred to the first packet redirector to thereby execute writing of data to the mirrored shared memories.

2. The storage subsystem according to claim 1, wherein the second switch has a second multicast function;
a second packet redirector is coupled to the second switch;
the second switch has the second processor and the second non-transparent bridge set within a second multicast group;
the second packet redirector causes the received packet to be transferred in the received order to the second multicast group address;
the first processor causes a packet to be transmitted to the first packet redirector or the second packet redirector to thereby execute writing of data to the mirrored shared memories; and
the second processor causes a packet to be transmitted to the first packet redirector or the second packet redirector to thereby execute writing of data to the mirrored shared memories.

3. The storage subsystem according to claim 2, wherein the first switch has a third non-transparent bridge;
the second switch has a fourth non-transparent bridge;
the third non-transparent bridge and the fourth non-transparent bridge are coupled via a second link;
the second link is used for writing data from the first processor or the second processor to the cache memories; and
the first link is used for writing data from the first processor or the second processor to the mirrored shared memories.

4. The storage subsystem according to claim 1, wherein the first packet redirector is a fifth non-transparent bridge built into the second switch.

5. The storage subsystem according to claim 2, wherein the second packet redirector is a sixth non-transparent bridge built into the first switch; and
a link coupling the first switch and the fifth non-transparent bridge and a link coupling the second switch and the sixth non-transparent bridge is a same third link.

6. The storage subsystem according to claim 5, wherein the third link has a first virtual channel and a second virtual channel, wherein the first virtual channel is used when the first processor transmits a packet to the fifth non-transparent bridge and the second virtual channel is used when the second processor transmits a packet to the sixth non-transparent bridge.

7. The storage subsystem according to claim 1, wherein the first packet redirector is a third switch having a seventh non-transparent bridge, and two ports of the third switch including a port associated with the seventh non-transparent bridge are coupled to the first switch.

8. The storage subsystem according to claim 2, wherein the second packet redirector is a fourth switch having an eighth non-transparent bridge, and two ports of the fourth switch including a port associated with the eighth non-transparent bridge are coupled to the second switch.

9. The storage subsystem according to claim 8, wherein
the first switch has a third non-transparent bridge;
the second switch has a fourth non-transparent bridge;
the third non-transparent bridge and the fourth non-transparent bridge are coupled via a second link;
the second link is used to write data from the first processor or the second processor to the cache memories; and
the first link is used to write data from the first processor or the second processor to the mirrored shared memories.

10. The storage subsystem according to claim 1, wherein upon reading control information from the mirrored shared memories, the first processor reads the information from the first memory and the second processor reads the information from the second memory.

11. The storage subsystem according to claim 1, wherein a first table for managing a write execution status from the first processor to the mirrored shared memories is stored in the first memory, and a second table for managing a write execution status from the second processor to the mirrored shared memories is stored in the second memory.

12. The storage subsystem according to claim 11, wherein the first processor sets an unfinished write flag associated with the control information in the first table;
transmits a packet storing the control information; and
transmits a packet storing data for clearing the unfinished write flag via a same data transfer path as the path through which the packet storing the control information is transmitted; wherein the second processor sets an unfinished write flag associated with the control information in the second table;
transmits a packet storing the control information; and
transmits a packet storing the data for clearing the unfinished write flag via a same data transfer path as the path through which the packet storing the control information is transmitted.

13. The storage subsystem according to claim 2, the storage subsystem having a first table for managing a write execution status from the first processor to the mirrored shared memories stored in the first memory and having a second table for managing a write execution status from the second processor to the mirrored shared memories stored in the second memory; wherein the first processor
determines whether a packet storing the control information should be sent to the first packet redirector or to the second multicast function;
sets an unfinished write flag associated with the control information in the first table by the first processor;
transmits a packet storing the control information; and
transmits a packet storing data for clearing the unfinished write flag via a same data transfer path as the path through which the packet storing the control information is transmitted; and wherein the second processor
determines whether the packet storing the control information should be transmitted to the second packet redirector or to the first multicast function;
sets an unfinished write flag associated with the control information in the second table;
transmits a packet storing the control information; and
transmits a packet storing the data for clearing the unfinished write flag via a same data transfer path as the path through which the packet storing the control information is transmitted.

14. The storage subsystem according to claim 12, wherein the first processor
reads an unfinished write flag associated with the control information from the first table; and
reads the control information from the first memory when the unfinished write flag shows a write finished status; and wherein the second processor
reads an unfinished write flag associated with the control information from the second table; and
reads the control information from the second memory if the unfinished write flag indicates a write finished status.

15. The storage subsystem according to claim 14, wherein when the unfinished write flag indicates a write unfinished status, the first processor delays the reading of the control information from the first memory until the unfinished write flag indicates a write finished status, and the second processor delays the reading of the control information from the second memory until the unfinished write flag indicates a write finished status.

16. A method for accessing mirrored shared memories in a storage subsystem having a storage controller, the storage controller comprising:
a first processor;
a first memory coupled to the first processor;
a first switch coupled to the first processor and having a first multicast function and a first non-transparent bridge;
a second processor;
a second memory coupled to the second processor;
a second switch coupled to the second processor and having a second non-transparent bridge;
a first packet redirector coupled to the first switch;
wherein the first non-transparent bridge and the second non-transparent bridge are coupled via a first link;
cache memories storing user data and mirrored shared memories storing control information are formed within the first memory and the second memory;
the first switch has the first processor and the first non-transparent bridge set within a same multicast group;
the first packet redirector causes the received packet to be transferred in the received order to the multicast group address; and
the first processor causes a packet to be transferred to the first packet redirector to thereby execute writing of data to the mirrored shared memories.

* * * * *